(12) United States Patent
Fretz et al.

(10) Patent No.: US 12,084,320 B2
(45) Date of Patent: Sep. 10, 2024

(54) WINCH INCLUDING A MOTOR MOUNTED CONTACTOR

(71) Applicant: Warn Industries, Inc., Clackamas, OR (US)

(72) Inventors: Darren G. Fretz, Oregon City, OR (US); Bryan Averill, Portland, OR (US); Clark Brumet, Happy Valley, OR (US); Thomas Paasch, Milwaukie, OR (US); Kevin Christensen, Portland, OR (US)

(73) Assignee: Warn Industries, Inc., Clackamas, OR (US)

( * ) Notice: Subject to any disclaimer, the term of this patent is extended or adjusted under 35 U.S.C. 154(b) by 381 days.

(21) Appl. No.: 17/315,956

(22) Filed: May 10, 2021

(65) Prior Publication Data

US 2021/0261390 A1 Aug. 26, 2021

Related U.S. Application Data

(63) Continuation of application No. 15/809,342, filed on Nov. 10, 2017, now Pat. No. 11,001,482.

(Continued)

(51) Int. Cl.
*H02K 11/00* (2016.01)
*B66D 1/12* (2006.01)
(Continued)

(52) U.S. Cl.
CPC ............. *B66D 1/12* (2013.01); *B66D 1/28* (2013.01); *B66D 1/40* (2013.01); *B66D 1/485* (2013.01);
(Continued)

(58) Field of Classification Search
CPC ............. B66D 1/12; B66D 1/28; B66D 1/40; B66D 1/485; B66D 3/20; B66D 2700/0141;
(Continued)

(56) References Cited

U.S. PATENT DOCUMENTS 4,884,784 A 12/1989 Nix et al.
5,853,165 A 12/1998 Kuivamaki
(Continued)

FOREIGN PATENT DOCUMENTS

CH 323104 A 7/1957
CN 102667009 A 9/2012
(Continued)

OTHER PUBLICATIONS

Notice of Allowance for related Chinese Application No. 202110655817.2; action dated Sep. 13, 2022; (5 pages).
(Continued)

*Primary Examiner* — Thomas Truong
(74) *Attorney, Agent, or Firm* — K&L Gates LLP

(57) ABSTRACT

Methods and systems are provided for a winch including a motor and a contactor assembly coupled around the motor. In one example, the contactor assembly is coupled around and in face-sharing contact with a portion of an outer surface of the motor. Additionally, the contactor assembly may include two or more coils spaced apart from one another within the contactor assembly.

8 Claims, 15 Drawing Sheets

Related U.S. Application Data

(60) Provisional application No. 62/436,362, filed on Dec. 19, 2016.

(51) Int. Cl.

| | | |
|---|---|---|
| *B66D 1/28* | (2006.01) | |
| *B66D 1/40* | (2006.01) | |
| *B66D 1/48* | (2006.01) | |
| *B66D 3/20* | (2006.01) | |
| *H02K 3/04* | (2006.01) | |
| *H02K 5/14* | (2006.01) | |
| *H02K 5/22* | (2006.01) | |
| *H02K 7/10* | (2006.01) | |
| *H02K 7/116* | (2006.01) | |
| *H02K 7/14* | (2006.01) | |
| *H02K 11/20* | (2016.01) | |
| *H02K 11/21* | (2016.01) | |
| *H02K 11/25* | (2016.01) | |
| *H02K 11/26* | (2016.01) | |
| *H02K 11/27* | (2016.01) | |
| *H02K 11/30* | (2016.01) | |
| *H02K 11/33* | (2016.01) | |
| *H02K 11/35* | (2016.01) | |
| *H02K 11/40* | (2016.01) | |
| *H02K 23/66* | (2006.01) | |
| *H02P 29/40* | (2016.01) | |

(52) U.S. Cl.
CPC .............. *B66D 3/20* (2013.01); *H02K 3/04* (2013.01); *H02K 5/14* (2013.01); *H02K 5/143* (2013.01); *H02K 5/225* (2013.01); *H02K 7/1004* (2013.01); *H02K 7/116* (2013.01); *H02K 7/14* (2013.01); *H02K 11/0094* (2013.01); *H02K 11/20* (2016.01); *H02K 11/21* (2016.01); *H02K 11/25* (2016.01); *H02K 11/26* (2016.01); *H02K 11/27* (2016.01); *H02K 11/30* (2016.01); *H02K 11/33* (2016.01); *H02K 11/35* (2016.01); *H02K 11/40* (2016.01); *H02K 23/66* (2013.01); *H02P 29/40* (2016.02); *B66D 2700/0141* (2013.01)

(58) Field of Classification Search
CPC ............ H02K 3/04; H02K 5/14; H02K 5/143; H02K 5/225; H02K 7/1004; H02K 7/116; H02K 7/14; H02K 11/0094; H02K 11/20; H02K 11/21; H02K 11/25; H02K 11/26; H02K 11/27; H02K 11/30; H02K 11/33; H02K 11/35; H02K 11/40; H02K 23/66; H02K 13/00; H02P 29/40
USPC ......................................................... 310/71
See application file for complete search history.

(56) References Cited

U.S. PATENT DOCUMENTS

| | | | |
|---|---|---|---|
| 5,877,569 | A | 3/1999 | Heinrich et al. |
| 7,891,641 | B1 | 2/2011 | Miller |
| 9,156,665 | B2 | 10/2015 | Fretz et al. |
| 2002/0092454 | A1 | 7/2002 | Meyerdierks |
| 2003/0205703 | A1 | 11/2003 | McCormick et al. |
| 2004/0145261 | A1 | 7/2004 | Ganter et al. |
| 2006/0091841 | A1 | 5/2006 | Roussel |
| 2009/0079281 | A1 | 3/2009 | Best et al. |
| 2011/0215285 | A1 | 9/2011 | Akhavein et al. |
| 2014/0001427 | A1* | 1/2014 | Fretz ................. B66D 1/28 254/362 |
| 2014/0049126 | A1 | 2/2014 | Jiant et al. |
| 2014/0264210 | A1 | 9/2014 | Heravi et al. |
| 2014/0264211 | A1 | 9/2014 | Fretz et al. |
| 2015/0298597 | A1 | 10/2015 | Salter et al. |
| 2018/0118531 | A1* | 5/2018 | August ................. B66D 1/12 |
| 2021/0261390 | A1* | 8/2021 | Fretz ................. B66D 1/28 |

FOREIGN PATENT DOCUMENTS

| | | |
|---|---|---|
| CN | 102893504 A | 1/2013 |
| CN | 103508344 A | 1/2014 |
| CN | 103975512 A | 8/2014 |
| CN | 104955758 A | 9/2015 |
| CN | 105073624 A | 11/2015 |
| CN | 105102361 A | 11/2015 |
| CN | 105752868 A | 7/2016 |
| DE | 911032 C | 5/1954 |
| DE | 102014007242 A1 | 11/2015 |
| EP | 0575045 A2 | 12/1993 |
| EP | 0831012 A2 | 3/1998 |
| FR | 1466692 A | 1/1967 |
| JP | H10338477 A | 12/1998 |
| JP | 2000023408 A | 1/2000 |
| JP | 4898962 B2 | 3/2012 |

OTHER PUBLICATIONS

Chinese Office Action and English translation for related Chinese Application No. 201711374157.0; action dated Apr. 3, 2020; (15 pages).

Chinese Office Action and English translation for related Chinese Application No. 201711375265.X; action dated Apr. 3, 2020; (21 pages).

Chinese Office Action and English translations for related Chinese Application No. 201711376453.4; action dated Feb. 25, 2019; (12 pages).

Chinese Office Action for related Chinese Application No. 201711376453.4; action dated Aug. 2, 2019; (3 pages).

Chinese Office Action for related Chinese Application No. 201711375265.X; action dated Apr. 30, 2019; (11 pages).

Chinese Office Action for related Chinese Application No. 201711374157.0; action dated Apr. 30, 2019; (12 pages).

Chinese Office Action and English translation for related Chinese Application No. 201711376453.4; action dated Feb. 25, 2019; (12 pages).

NL Search Report for related NL Application No. 2019911; report dated Jun. 29, 2018; (18 pages).

NL Search Report for related NL Application No. 2019912; report dated Jun. 29, 2018; (16 pages).

NL Search Report for related NL Application No. 2019913; report dated Jul. 6, 2018; (16 pages).

Examination Report for related Australian Application No. 2017251709; action dated Jul. 28, 2022; (5 pages).

Office Action for related Chinese Application No. 202110655817.2; action dated Jul. 29, 2022; (6 pages).

\* cited by examiner

WINCH INCLUDING A MOTOR MOUNTED CONTACTOR

CROSS REFERENCE TO RELATED APPLICATIONS

The present application is a Continuation Application of U.S. Non-Provisional application Ser. No. 15/809,342 entitled "WINCH INCLUDING A MOTOR MOUNTED CONTACTOR" filed on Nov. 10, 2017, which claims priority to U.S. Provisional Patent Application No. 62/436,362, entitled "WINCH INCLUDING INTEGRATED CONTACTOR AND MOTOR," filed on Dec. 19, 2016, the entire contents of which are hereby incorporated by reference for all purposes.

FIELD

The present application relates generally to a winch including a motor and a contactor assembly positioned within a same housing and/or coupled together within a space defined by a drum support of a motor assembly.

SUMMARY AND BACKGROUND

Winches may include a motor for driving a rotatable drum of the winch to pull in or pull out a cable wound around the drum. In one example, winches may be controlled via a control unit located at a location away from the motor. Further, a remote control may wirelessly (or via a wired connection) control winch operation through electronic communication with the control unit.

The winch motor may be electrically coupled with a power source in order to drive the motor. In some examples, a contactor assembly is electrically coupled between the motor and the power source in order to control a flow of electrical current from the power source to the motor. The contactor assembly is often mounted to an exterior surface of a housing of the winch or motor, thereby resulting in a plurality of wires electrically coupling the motor to the contactor assembly and the contactor assembly to the power source. In examples in which a control unit is coupled to the winch, the control unit may also be electrically coupled to the contactor assembly via another plurality of wires. As a result of the numerous wired electrical connections between the motor, contactor assembly, power source, and control unit, an installation and/or setup time of the winch may be increased. Additionally, in some environments the plurality of wires may be exposed to harsh weather conditions, may be become tangled and/or frayed, etc., thereby resulting in degradation of the electrical connections between components of the winch and/or the power source.

Thus in one example, the above issues may be at least partially addressed by a motor assembly for a winch, comprising: a motor; and a contactor assembly coupled around and in face-sharing contact with a portion of an outer surface of the motor, the contactor assembly including two or more coils spaced apart from one another within the contactor assembly. In this way, electrical connections between the motor and contactor assembly may be of reduced length, thereby saving space and reducing degradation of the electrical connection (e.g., due to exposure to outside elements). A total packaging space for all components of the motor assembly may also be reduce and contained within a space defined by a drum support of the winch.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-5 and 7-13 are shown to scale, although other relative dimensions may be used.

DETAILED DESCRIPTION

Figure 1:
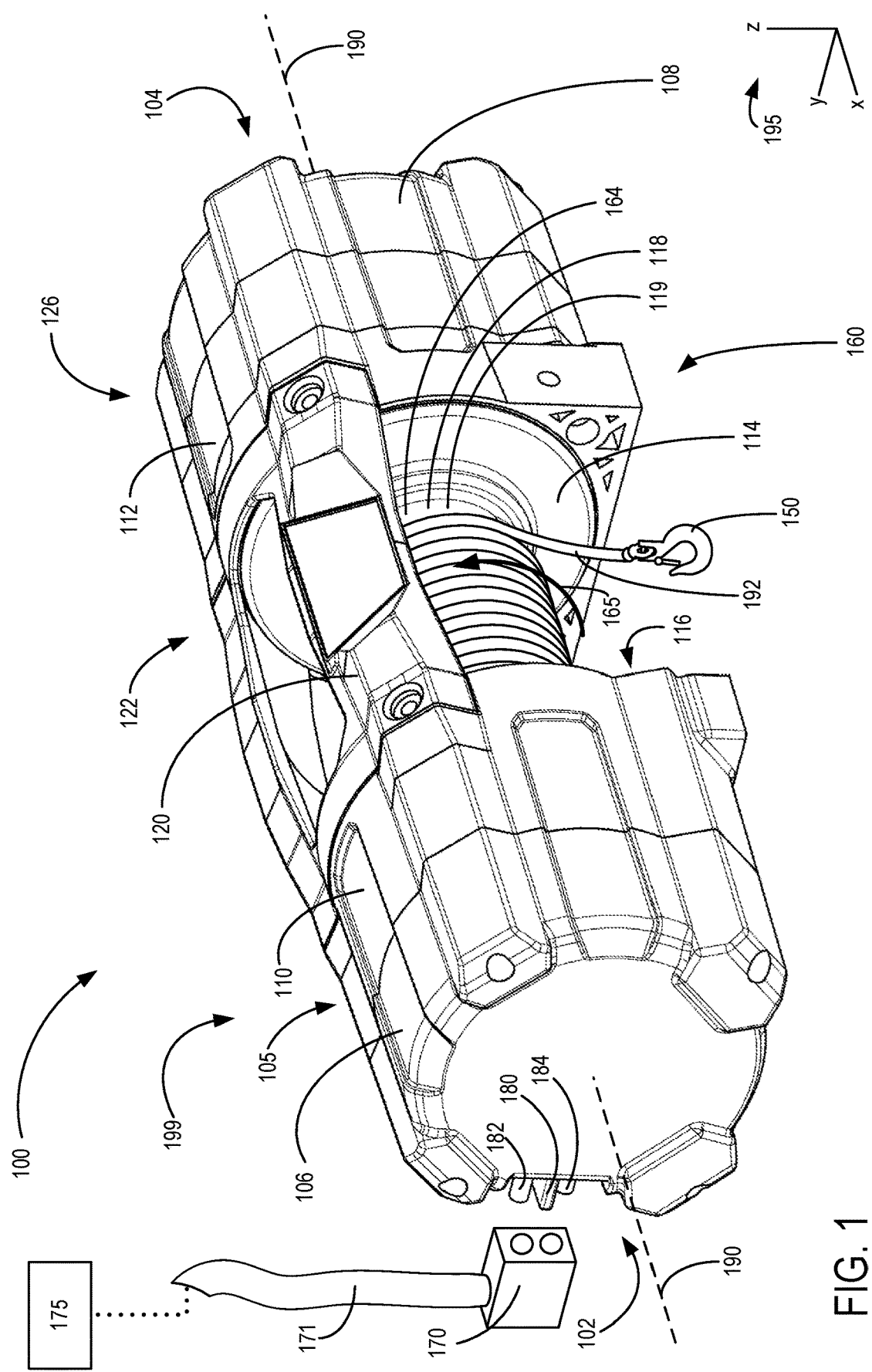
FIG. 1 shows a perspective view of a winch including a motor housing.
Figure 2:
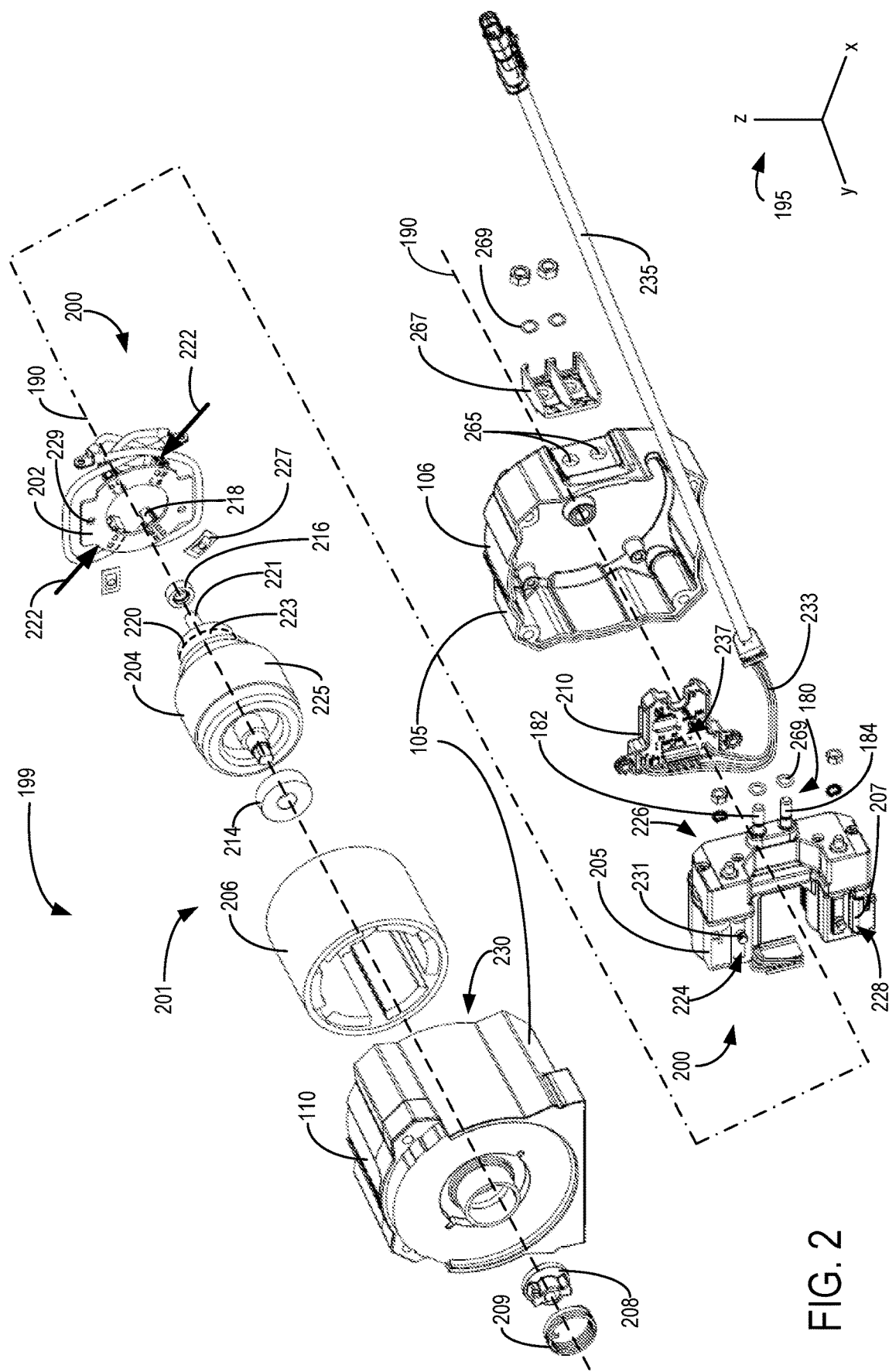
FIG. 2 shows an exploded view of a motor assembly including a motor and a contactor assembly coupled within the motor housing.
Figure 3A:
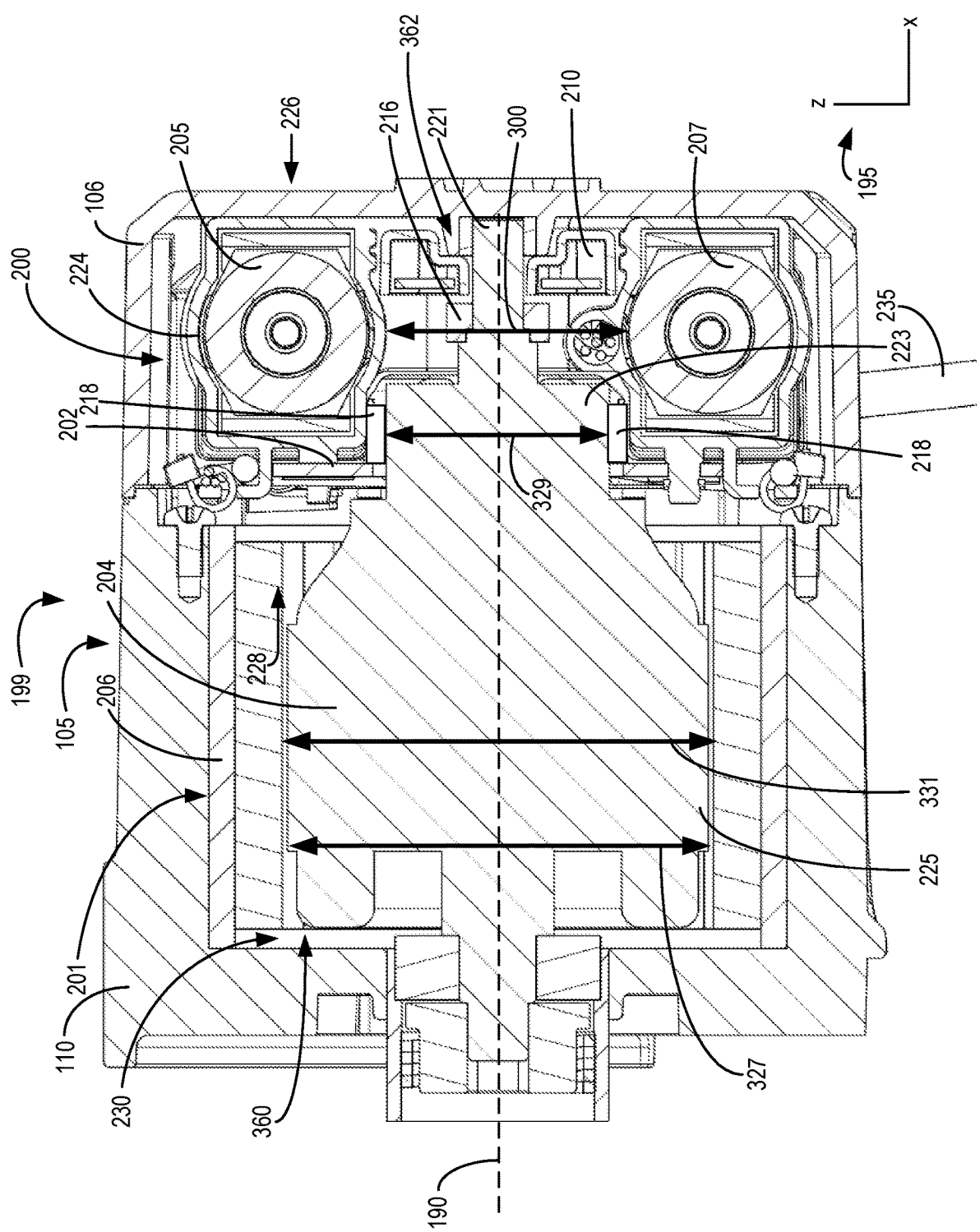
FIG. 3A shows a cross-sectional view of the motor and the contactor assembly included within the motor housing.
Figure 3B:
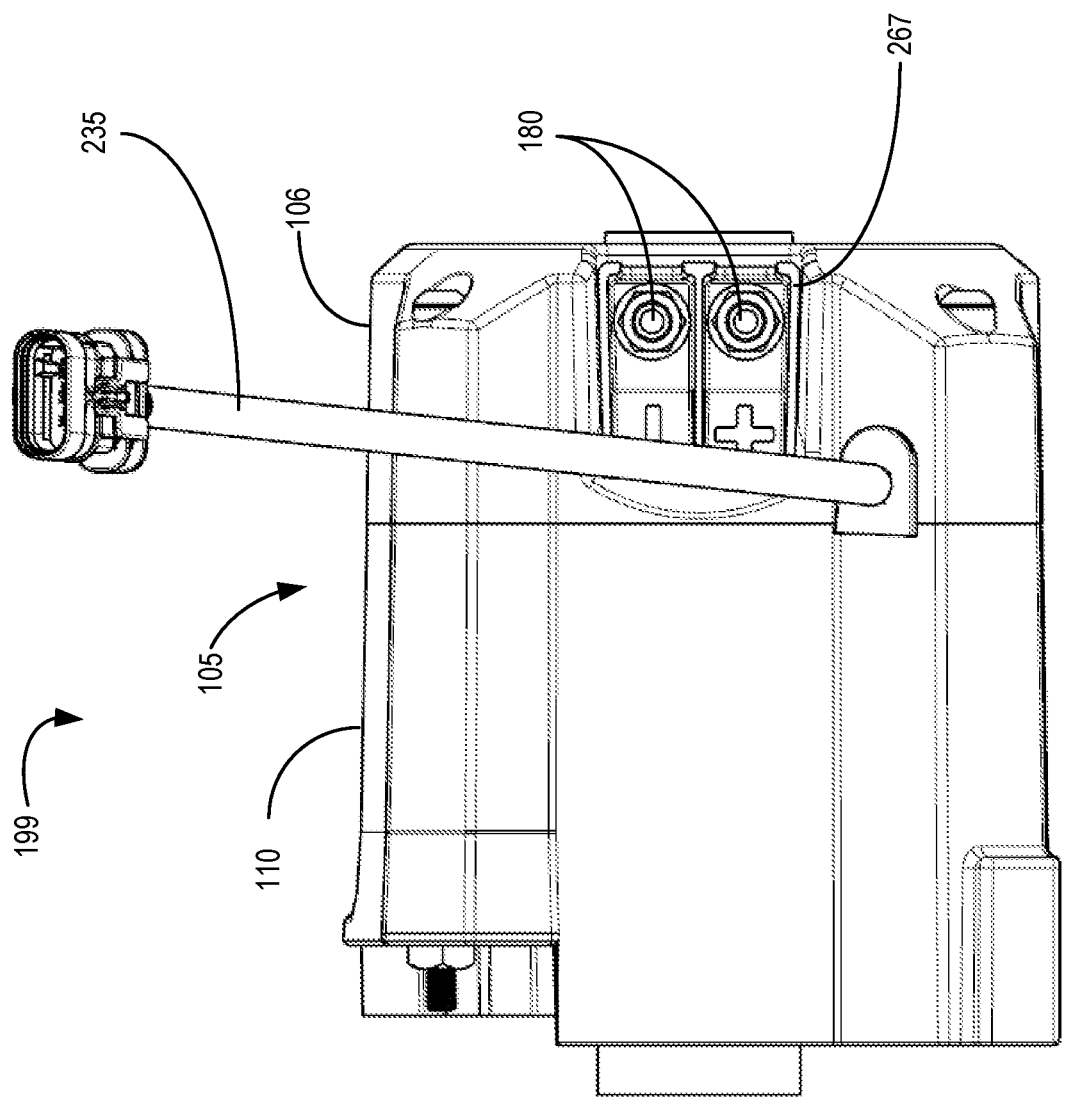
FIG. 3B shows an assembled view of the motor assembly of FIGS. 2 and 3A.
Figure 4:
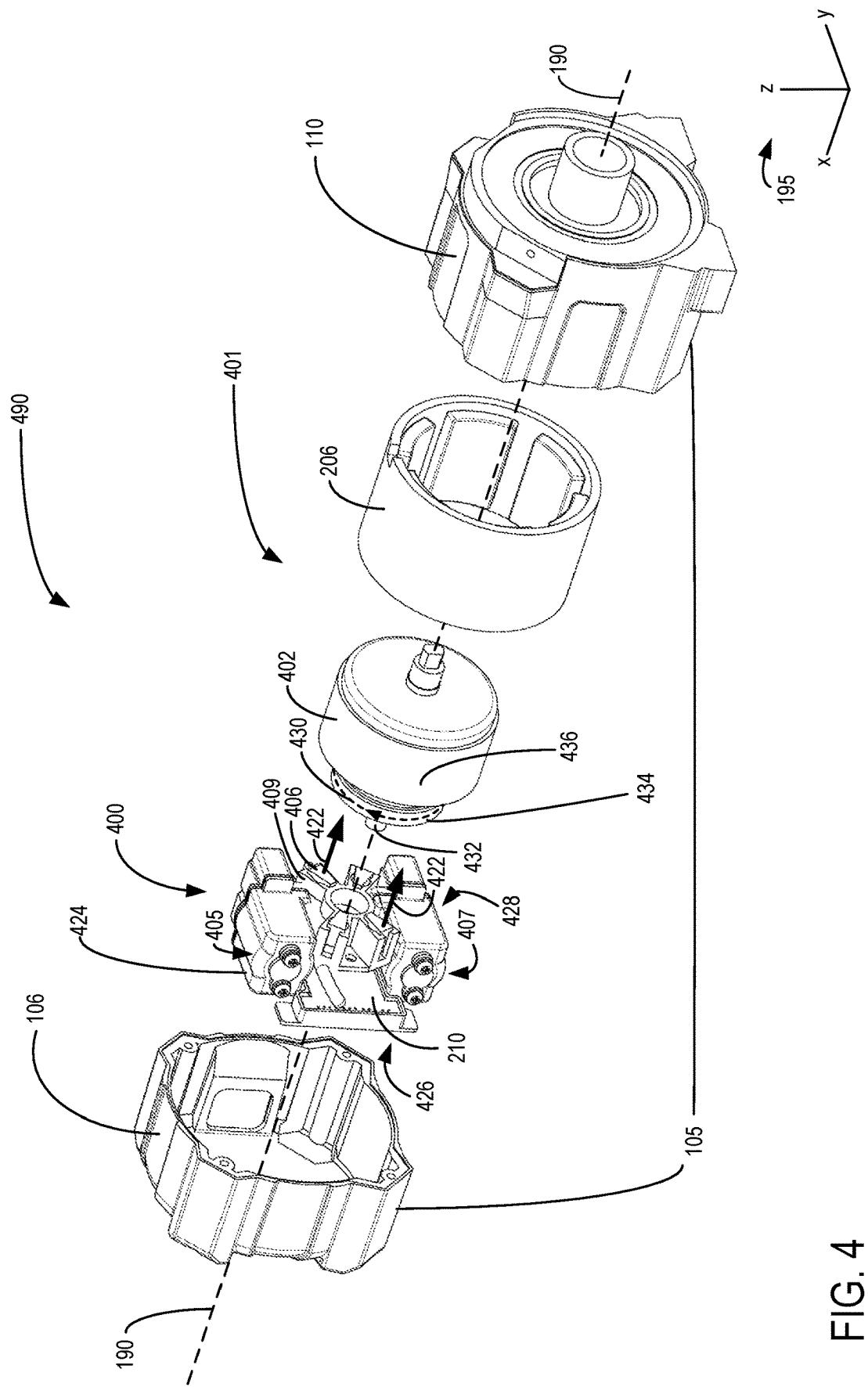
FIG. 4 shows an exploded view of an alternate embodiment of a motor assembly including a motor and a contactor assembly coupled within the motor housing.
Figure 5:
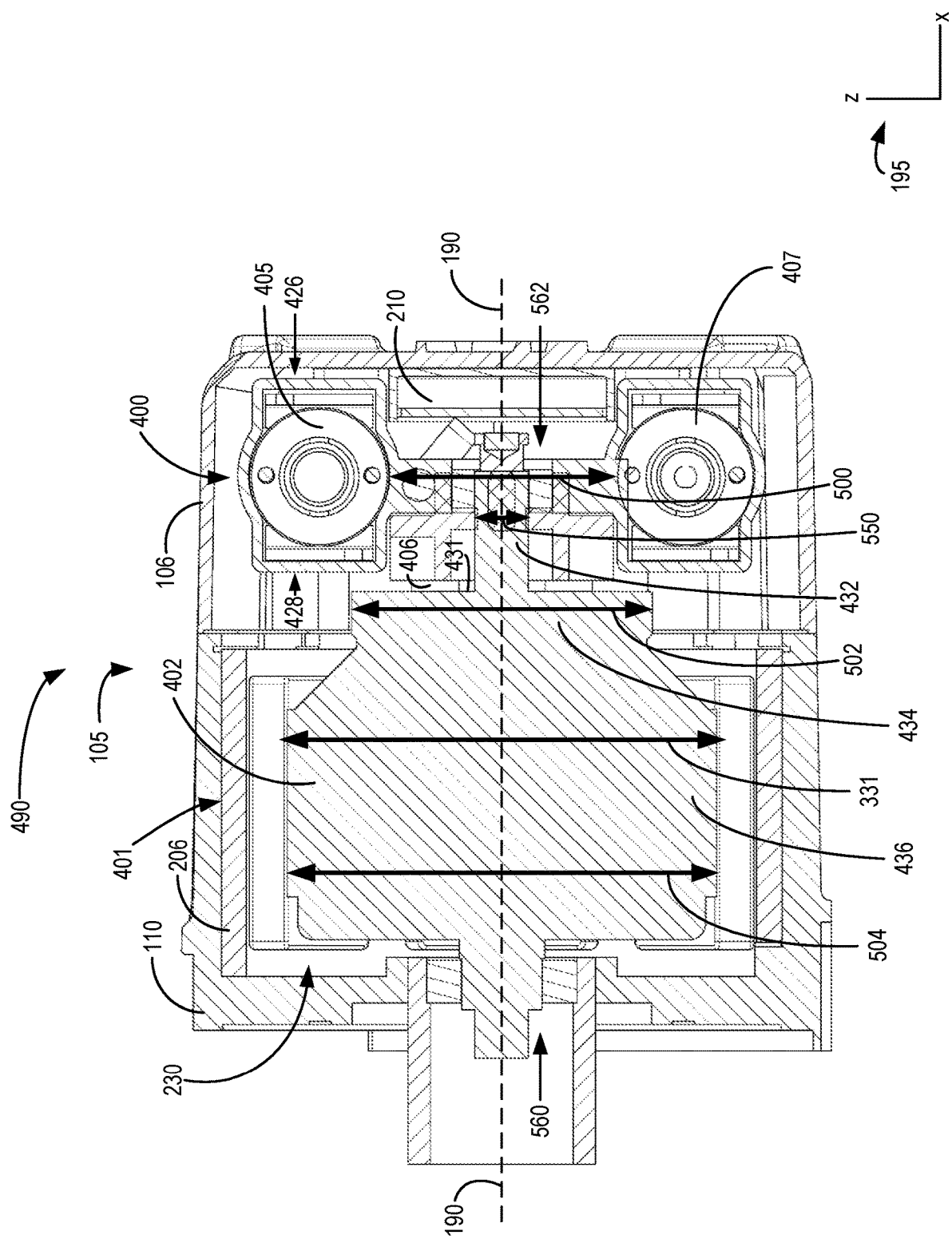
FIG. 5 shows a cross-sectional view of the alternate embodiment of the motor and the contactor assembly included within the motor housing.
Figure 6:
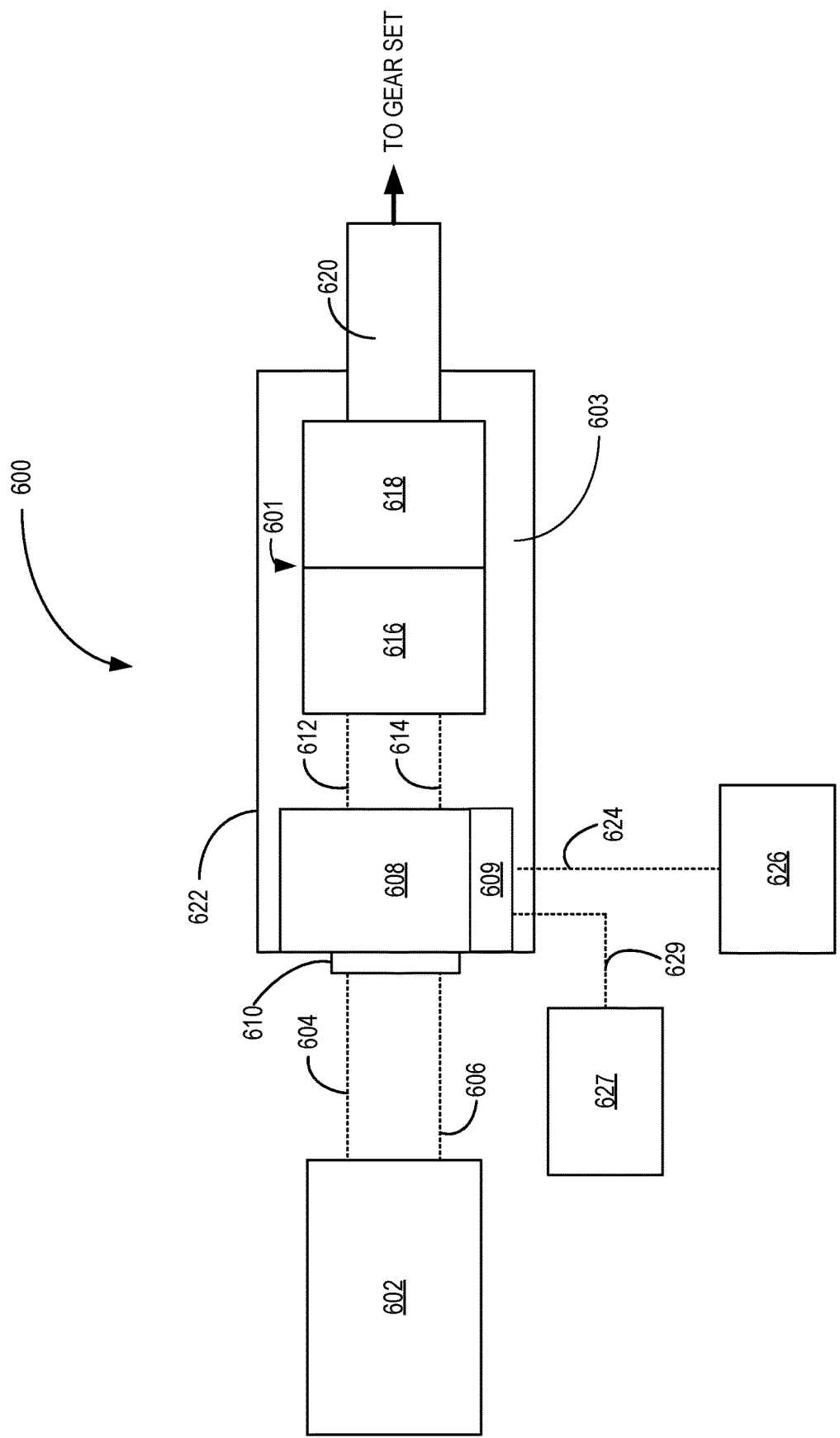
FIG. 6 schematically shows a motor assembly of a winch, the motor assembly including a motor and a contactor assembly positioned within an interior of a motor housing.
Figure 7:
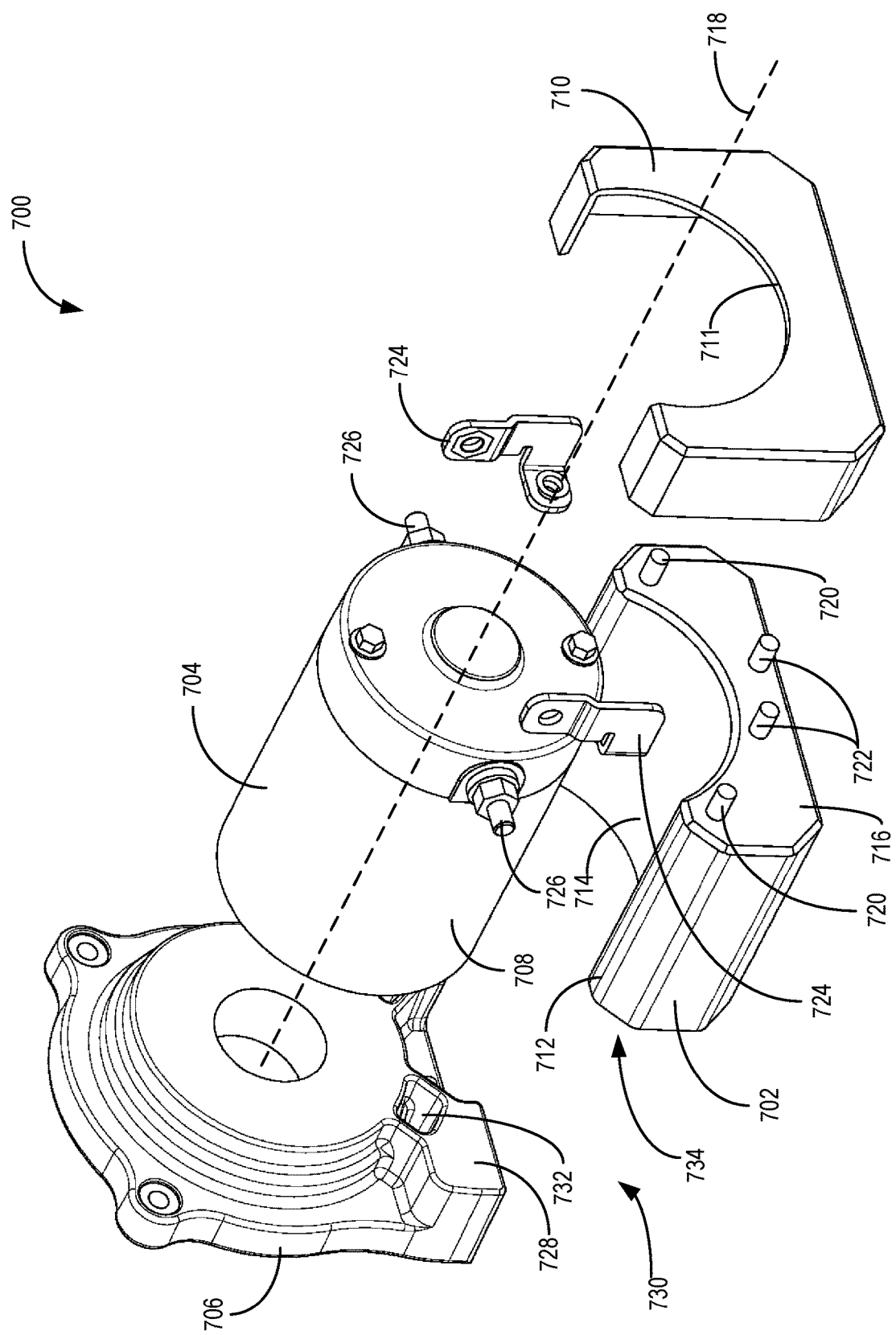
FIG. 7 shows an exploded view of a motor assembly including a contactor assembly mounted around a motor of the motor assembly from a first end.
Figure 8:
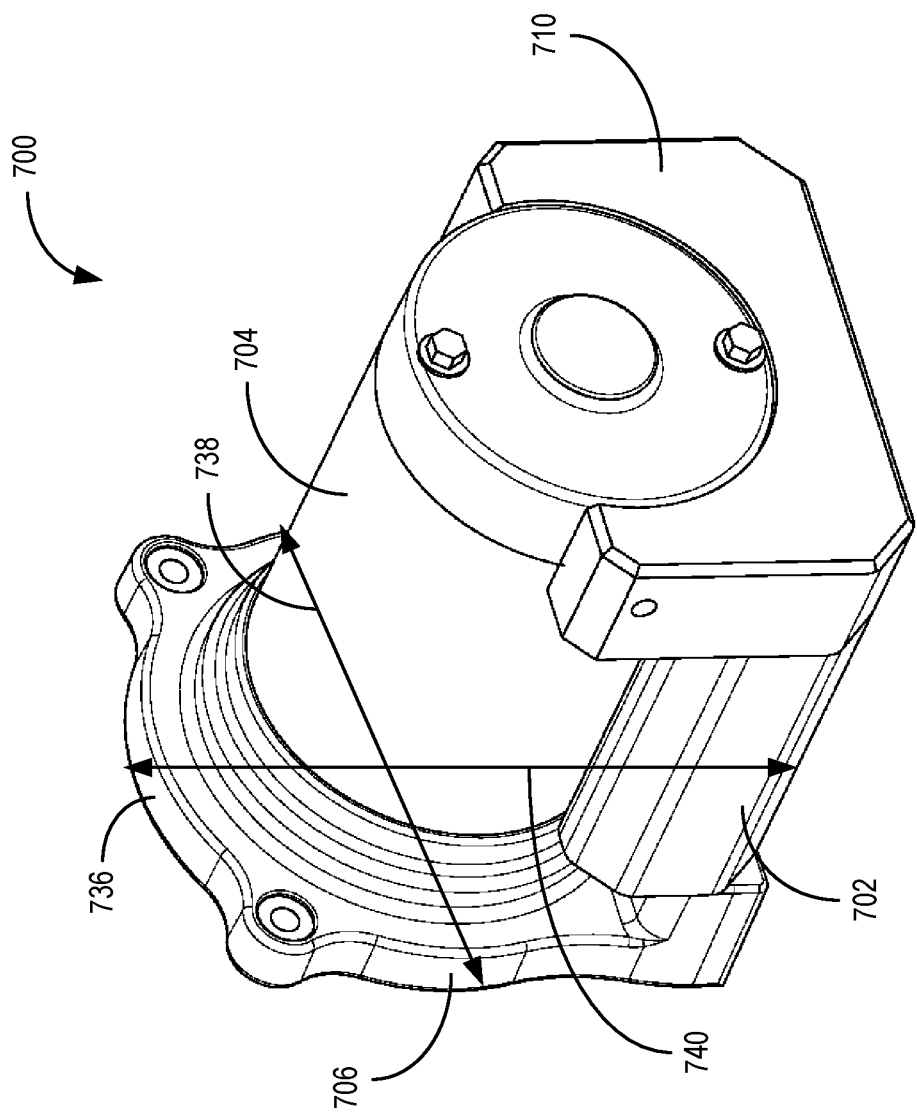
FIG. 8 shows an assembled view of the motor assembly of FIG. 7.
Figure 9:
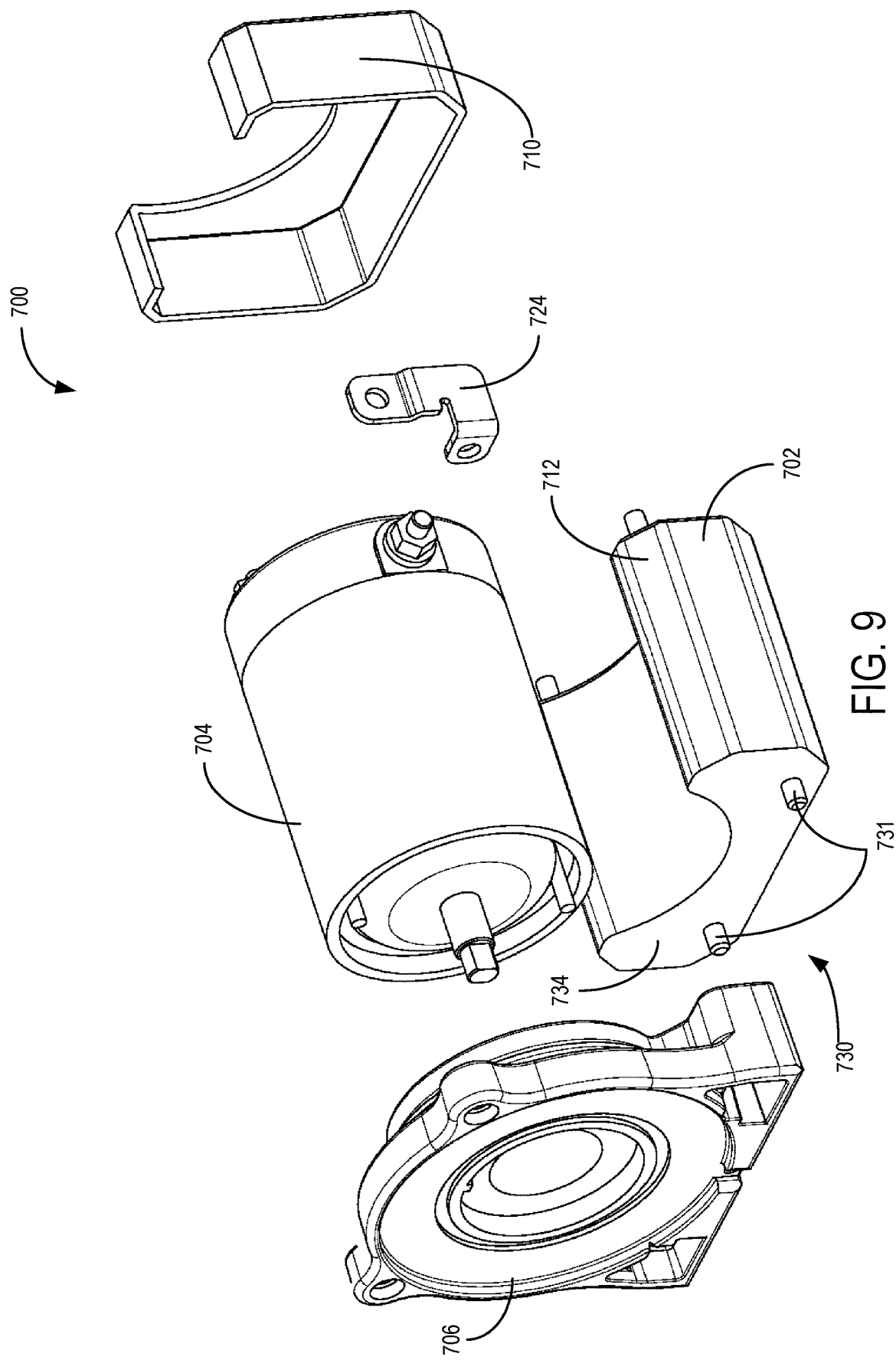
FIG. 9 shows an exploded view of the motor assembly of FIG. 7 from a second end.

The following detailed description relates to systems and methods for a winch including a motor and a contactor assembly positioned within a same housing and/or arranged together within a space defined by a drum support of the winch. A winch, such as the winch shown by FIG. 1, includes a rotatable drum drivable by a motor and coupled with a gear set. The motor is positioned within an interior of a motor housing and is directly coupled with a contactor assembly within the motor housing. The contactor assembly includes a plurality of electrical terminals, a controller, a brush assembly, and a plurality of conductive brushes mounted to the brush assembly. In one example, each of the brushes is biased in a radial direction toward an outer circumferential surface of an armature of the motor and in a direction perpendicular to a rotational axis of the motor, as shown by FIGS. 2-3. In another example, each of the brushes is biased in an axial direction toward an end surface of the armature and in a direction parallel to the rotational axis of the motor, as shown by FIGS. 4-5. The brushes press against the corresponding surface of the armature and may be energized via the contactor in order to flow electrical energy to the motor. The brush assembly may be a separate unit removably coupled to a contactor housing of the contactor assembly (as shown by FIGS. 2-3), or the brush assembly and contactor housing may be formed (e.g., integrated) together as a single unit (as shown by FIGS. 4-5). By directly coupling the contactor assembly with the motor within the motor housing, an amount of external electrical connections (e.g., wires) coupling a power source to the contactor assembly and motor may be reduced, as shown at FIG. 6. In this way, an ease of installation of the contactor assembly may be increased and a maintenance of the motor may be simplified. In an alternate embodiment, the contactor assembly may be mounted around a motor of the winch. For example, as shown in FIGS. 7-9, a contactor may be mounted against and around a portion of a motor of a winch. In another example, as shown by FIGS. 10A-13, the motor includes a field coil array directly, electrically coupled to the contactor assembly.

A winch including a motor and a contactor assembly positioned within a motor housing is described below with reference to FIGS. 1-5. FIG. 1 shows an example of a winch which may include a motor assembly including a motor and a contactor assembly positioned within a motor housing, such as the motor and contact assembly shown in a first embodiment by FIGS. 2-3 and a second embodiment by FIGS. 4-5. Reference axes 195 are included by each of FIGS. 1-5 for comparison of each view.

FIG. 1 shows a perspective view of a winch 100 including a housing 160 and a motor assembly 199. Housing 160 includes a first drum support 110 and a second drum support 112. The housing 160 further includes a motor housing 105 formed by the first drum support 110 coupled to a motor end cap 106 and a gear housing 126 formed by the second drum support 112 coupled to a gear end cap 108. In some examples, the motor end cap 106 may be mounted (e.g., fastened) directly to the first drum support 110. In other examples, the motor end cap 106 may be indirectly mounted to the first drum support 110 via a coupling to one or more components (e.g., additional housing elements) between the motor end cap and the first drum support 110. A motor is disposed within the motor housing 105 and a gear reduction unit including a plurality of gears (e.g., such as a planetary gear set) and a clutch is disposed within the gear housing 126. A tie structure 120 is positioned at a top side 122 of the winch. A controller (shown by FIGS. 2-3 in a first embodiment and FIGS. 4-5 in a second embodiment) positioned within the motor housing 105 may be an electronic controller (such as a microcontroller) and may control a speed of the motor within the motor housing 105 and/or a gear selection of a gear set (e.g., gear reduction unit) positioned within the gear housing 126. In some examples, the controller may control operation of one or more accessories of the winch (e.g., winch lights, lights of a vehicle coupled to the winch, etc.), as described further below with reference to FIG. 6. In one example, an operator of the winch may provide input (e.g., instructions) to the controller via wireless communication (e.g., via a remote control). For example, the operator may interface with a remote control in order to select a mode of operation of the winch 100 as described below.

The motor and gear set are each coupled to a drum 118 of the winch 100 in order to rotate the drum 118 around a central axis 190. The motor housing 105 is positioned at a first end 102 of the winch 100 and the gear housing 126 is positioned at a second end 104 of the winch 100, with the first end 102 being opposite to the second end 104 in a direction of the central axis 190. The drum 118 is coupled to the motor through the gear reduction unit which is coupled to the motor through an interior of a cylindrical portion 164 of the drum 118. The controller may also control a position of the clutch disposed within the gear housing 126. The clutch may engage and disengage the gear reduction unit (e.g., transmission of the winch) with a drum 118 of the winch 100, thereby allowing the drum 118 to be driven by the motor or freespool (e.g., freely rotate without input from the motor and gear reduction unit).

In one example operation of the winch 100, the motor may drive the drum 118 to rotate around the central axis 190 in a first direction 165 or a second direction opposite to the first direction. For example, the motor may be driven in the first direction 165 in order to rotate the drum 118 around the central axis 190, and the motor may be driven in the second direction opposite to the first direction in order to rotate the drum 118 around the central axis in the second direction. In this example, a selected gear of the gear set may adjust a rotational speed of the drum relative to a rotational speed of the motor. In one example, a rope (e.g., cable) 192 may be wound around an outer surface 119 of the drum 118 in order to perform pulling operations via the winch 100. In some examples, the rope 192 may be coupled with a hook 150 in order to increase an ease of attachment of the rope 192 to an object (e.g., a vehicle) to perform pulling operations.

The drum 118 includes a first flange (indicated by arrow 116 and referred to herein as first flange 116) positioned at a first end of the cylindrical portion 164 of the drum 118 and a second flange 114 positioned at a second end of the cylindrical portion 164 of the drum 118. The first flange 116 and second flange 114 each are cylindrical in shape and have a diameter that is greater than a diameter of the cylindrical portion 164 of the drum 118 (e.g., the portion extending between the first flange 116 and second flange 114). The first flange 116 is supported by first drum support 110 while the second flange 114 is supported by second drum support 112. The first flange 116 and second flange 114 are coupled with their respective supports (e.g., first drum support 110 and second drum support 112, respectively) such that each flange is rotatable within the corresponding drum support when the motor is actuated to drive the drum 118 (or when the drum is in a freespool mode). In other words, as the motor within motor housing 105 is energized by a power source 175 (e.g., a vehicle battery, indicated schematically by FIG. 1), the motor may drive the drum 118 to rotate around the central axis 190. In one example, the motor may be energized in response to a selection of an operation mode by an operator of the winch (e.g., via a remote control) as described above. As the drum 118 is driven, the first flange 116 rotates within the first drum support 110 and the second flange 114 rotates within the second drum support 112.

The winch 100 includes electrical terminals 180 extending outward from a contactor assembly positioned within an interior of the motor housing 105 and shown by FIGS. 2-5. Electrical terminals 180 include a first terminal 182 and a second terminal 184. In one example, first terminal 182 may be an electrical power source input and second terminal 184 may be an electrical ground input. In another example, first terminal 182 may be an electrical ground input and second terminal 184 may be an electrical power source input. In some examples, electrical current may flow from the power source 175 to the electrical terminals 180 via a power cable 171 coupled to a plug 170. Plug 170 is shaped to couple with the electrical terminals 180 in order to flow electrical current to the contactor assembly. As described below in a first embodiment with reference to FIGS. 2-3 and a second embodiment with reference to FIGS. 4-5, electrical current may flow from the power source 175 and through the contactor assembly to the motor in order to energize the motor.

By positioning the contactor assembly within the motor housing 105 and directly coupling the contactor assembly to the motor according to the configurations described below, an amount of wired electrical connections coupling the motor to the power source 175 may be reduced. For example, the power cable 171 is the only wired electrical connection coupling the contactor assembly to the power source 175, and because the contactor assembly is directly coupled with the motor, electrical current may flow directly from the power source 175 to the motor via the contactor assembly without an additional power cable (similar to power cable 171) coupled between the contactor assembly and the motor.

FIG. 2 shows an exploded view of the motor assembly 199 shown by FIG. 1, with the motor assembly 199 including a first embodiment of a contactor assembly 200. In some embodiments, the motor assembly 199 may be referred to as a combined, or integrated, motor assembly that includes contactor assembly 200 and motor 201. In the first embodiment shown by FIGS. 2-3, the contactor assembly 200 includes a plurality of brushes 218 arranged in a radial configuration relative to the central axis 190. Each of the brushes is mounted to a brush assembly 202, and the brush assembly 202 is removably coupled with a contactor housing 224. In other words, the brush assembly 202 and contactor housing 224 are not formed together as a single piece (e.g., not integrated together). In another embodiment, the brush assembly 202 may be additionally or alternatively mounted to the motor end cap 106, drum support 110, or flux ring 206. Alternate embodiments may include an axial configuration of the brushes 218 such as the configuration shown by FIGS. 4-5 and described below. In another embodiment, the radial configuration of the brushes 218 may be included in an assembly where the brush assembly and contactor housing are formed together as a single piece (e.g., integrated together, similar to the example shown by FIGS. 4-5).

As described above with reference to FIG. 1, motor housing 105 includes the first drum support 110 and the motor end cap 106. The first drum support 110 and motor end cap 106 may be coupled (e.g., directly coupled) together via a plurality of fasteners (e.g., bolts, not shown). Motor 201 and contactor assembly 200 are coupled together within an interior of the motor housing 105, as indicated in part by an interior 230 of the first drum support 110 shown by FIGS. 2-3A. The motor end cap 106 includes one or more apertures 265 (e.g., openings) shaped to receive the electrical terminals 180 of the contactor assembly 200 when the motor 201 and contactor assembly 200 are coupled together within the motor housing 105. In other words, the electrical terminals 180 and aperture 265 are arranged at a same end of the contactor assembly 200 when the motor 201 and contactor assembly 200 are coupled together within the motor housing 105. In this configuration, the electrical terminals 180 extend outward from the interior of the motor housing 105, as shown by FIG. 1 and described above. The motor end cap 106 further includes a terminal isolator 267 coupled to an outside of the motor end cap 106 and adapted to electrically isolate the electrical terminals 180 from one another and the external environment. A plurality of o-rings 269 may also surround each of the electrical terminals 180.

The motor 201 includes an armature 204 shaped to fit within a flux ring 206. Flux ring 206 is shaped to fit within the interior 230 of the first drum support 110 and is rotationally fixed (e.g., non-rotatable) relative to the first drum support 110. Flux ring 206 is configured to produce a magnetic field within the interior 230 of the first drum support 110 (e.g., within an inner diameter 331 of the flux ring 206, as shown by FIG. 3A). In one example, the magnetic field produced by the flux ring 206 may be due to a plurality of permanent magnets included within the flux ring 206. In other examples, the magnetic field may be due to an energization of electrically conductive coils of the flux ring 206 by the power source 175 (shown schematically by FIG. 1).

In examples in which the flux ring 206 includes electrically conductive coils, the coils may be energized via direct contact with one or more electrically conductive surfaces of the contactor assembly 200.

The armature 204 includes a first portion 221, a second portion 223, and a third portion 225. The third portion 225 may have an outer diameter 327 (shown by FIG. 3A) slightly less than the inner diameter 331 of the flux ring 206, and the second portion 223 may have an outer diameter 329 (shown by FIG. 3A) less than the outer diameter 327 of the third portion 225. The armature 204 is rotatably mounted within the motor housing 105 by one or more fasteners, springs, and bearings (e.g., spring 209, coupler 208, and bearing 214). In other words, the armature 204 is coupled to the motor housing 105 such that the armature 204 may rotate relative to the motor housing 105 in a direction around the central axis 190, such that the central axis 190 is a rotational axis of armature 204 (e.g., a rotational axis of motor 201). An interior of the third portion 225 of the armature 204 includes a plurality of energizable coils electrically coupled with the second portion 223. The coils of the armature 204 may be energized via direct contact of the second portion 223 with the plurality of brushes 218 of the contactor assembly 200 (as described further below). Electrical current flowing through the coils interacts with the magnetic field produced by the flux ring 206 and results in a rotational motion of the armature 204 around the central axis 190. As described above with reference to FIG. 1, the armature 204 is coupled to a gear reduction unit through an interior of a cylindrical portion 164 of the drum 118 (shown by FIG. 1) such that rotation of the armature 204 drives the gear reduction unit, and driving the gear reduction unit may rotate the drum 118.

Each of the brushes 218 are coupled (e.g., mounted) to the brush assembly 202 and in one example may be arranged such that each brush 218 presses against the second portion 223 along an outer circumference 220 of the second portion 223, as shown by FIGS. 2-3A. In the example shown by FIGS. 2-3A, the brushes 218 are positioned radially around the central axis 190. Each brush 218 may be urged toward the central axis 190 (e.g., in a radial direction 222 relative to the central axis 190) by one or more biasing members (e.g., springs, not shown). The brushes 218 and biasing members may each be formed of electrically conductive materials. In one example, the brushes 218 may be made of carbon and the biasing members may be made of a conductive metal such as copper or steel.

In the example shown by FIGS. 2-3A, the brush assembly 202 may be coupled (e.g., mechanically coupled) to a first side 228 of a contactor housing 224 of the contactor assembly 200 via one or more fasteners (e.g., push nuts 227), fastening apertures 229 on the brush assembly 202, and mounting extensions 231 on the first side 228 of the contactor housing 224, with the first side 228 being opposite to a second side 226 of the contactor housing 224 in the direction of the central axis 190. The first side 228 of the contactor housing 224 is further from the motor end cap 106 than the second side 226 in the direction of the central axis 190. In other examples, the brush assembly 202 and contactor housing 224 may instead be formed together as a single piece (e.g., molded together), with the brush assembly 202 positioned at the first side 228.

The contactor housing 224 includes a first coil 205 and a second coil 207 (shown by FIG. 3A and indicated by arrows in FIG. 2) positioned within an interior of the contactor housing 224. However, in alternate embodiments, the contactor housing 224 may include two or more coils (such as first coil 205, second coil 207, and an additional, third coil). In the example shown by FIGS. 2-3, the first coil 205 and second coil 207 are positioned opposite to each other in a direction perpendicular to the central axis 190 (and across the central axis 190) such that an outer surface of the first coil 205 and an outer surface of the second coil 207 are separated by a distance 300 (shown by FIG. 3A). In some examples, the brush assembly 202 is positioned between the first coil 205 and second coil 207 such that the brush assembly 202 fits within the distance 300 and surrounds the first portion 221 of the armature 204. In alternate examples, the brushes 218 of the brush assembly 202 may be positioned proximate to but outside of the gap that separates the first coil 205 and second coil 207. The first coil 205 and/or second coil 207 may be energized in order to flow electrical current through the contactor assembly 200 and the brushes 218, thereby energizing the armature 204 as described above. In one example, energization of the first coil 205 and/or second coil 207 may apply a magnetic force to components internal to the contactor housing 224 in order to close an electrical circuit between the brushes 218 and the power source 175 (shown by FIG. 1), thereby flowing electrical current from the power source 175 to the brushes 218 via the contactor assembly 200.

In one example, energization of the first coil 205 and/or second coil 207 may be controlled by a controller 210 positioned within the motor housing 105. In some examples, controller 210 is directly coupled with the contactor assembly 200. The controller 210 may include instructions stored in non-transitory memory to energize the first coil 205 and/or the second coil 207 in response to input by an operator of the winch (e.g., winch 100 shown by FIG. 1). For example, the operator of the winch may interface with a remote control (or another remote controller device such as a wired remote, wireless remote, a vehicle system controller, or the like) in order to send a wireless signal (e.g., radio wave signal) to the controller 210 indicating that a rotation of the drum 118 (shown by FIG. 1) in a first direction is desired by the operator. The controller 210 may then energize the first coil 205 and/or the second coil 207 in order to flow electrical current through the brushes 218 and into the armature 204, thereby rotating the armature 204 around the central axis 109 and driving the gear reduction unit to rotate the drum 118 in the first direction. In another example, the operator of the winch may interface with the remote control in order to send a wireless signal to the controller 210 indicating that a rotation of the drum 118 in a second direction opposite to the first direction is desired by the operator. The controller 210 may then energize the first coil 205 and/or the second coil 207 in order to flow electrical current through the brushes 218 and into the armature 204, thereby rotating the armature 204 around the central axis 109 and driving the gear reduction unit to rotate the drum 118 in the second direction.

In some examples, the controller 210 may include a motor speed sensor, motor current sensor, voltage sensor, motor direction sensor, motor position sensor, drum rotation sensor, and/or motor temperature sensor, and the controller 210 may be configured to receive and/or transmit wired and/or wireless signals from/to a controller area network (CAN) and/or winch accessories (e.g., an electric free spooling clutch actuator). In another example, as shown in FIG. 2, the controller 210 may include a plurality of electrical wires 233 for electrically coupling the controller 210 to an external system (such as a vehicle system) and/or external controller (such as a vehicle controller), which are encased within an electrical (e.g., power) cable 235 that extends from an exterior of the motor assembly, as shown in FIG. 3B. In the embodiment shown by FIGS. 2-3A, a motor shaft sensor 216 (which may be referred to herein as a motor speed sensor) is coupled to the first portion 221 of the armature 204 (e.g., inserted into the first portion 221 in an axial direction relative to the central axis 190 and extending away from the armature 204 in the axial direction). Motor shaft sensor 216 may sense a speed and/or position of the armature 204 relative to the contactor housing 224 and send electrical signals to the controller 210 to indicate the speed and/or position of the armature 204. For example, the motor shaft sensor 216 may be adapted to measure one or more of a rotational speed of the motor, a direction of rotation of the motor, and a position of the motor.

The controller 210 may include instructions stored thereon for adjusting operation of the motor 201 in response to an output of the motor shaft sensor, temperature sensor, current sensor, voltage sensor, and/or signals from the remote control (as described above). As shown in FIG. 2, one or more sensors 237 (including the temperature sensor, current sensor, voltage sensor, or the like) may be directly coupled to the controller 210. The temperature sensor may be configured to measure a temperature of the motor 201. In one example, the controller 210 may monitor (e.g., measure) an output of the temperature sensor and compare the measured temperature to a threshold temperature. If the measured temperature exceeds the threshold temperature, the controller may de-energize (e.g., turn off) the motor 201 in order to reduce the temperature of the motor 201. By coupling the temperature sensor directly to the controller, the temperature sensor may measure the temperature of the motor 201, and the controller 210 may directly interpret the measured temperature from the temperature sensor without additional electrical connections. For example, in winches that do not include a temperature sensor directly coupled with a controller (e.g., winches in which the controller is positioned outside of the motor housing), the temperature sensor may be electrically wired with the controller, thereby increasing an amount of wired electrical connections to the motor housing, or the temperature sensor may be in remote communication with the controller (e.g., via a wireless signal), thereby increasing a complexity and/or cost of the temperature sensor and/or controller. By coupling the temperature sensor directly to the controller, the amount of wired connections and/or wireless connections between the temperature sensor and controller is decreased.

In another example, the voltage sensor may be configured to measure an operating voltage of the motor 201. The controller 210 may monitor (e.g., measure) an output of the voltage sensor and compare the measured voltage to an upper threshold voltage. If the measured voltage exceeds the upper threshold voltage, the controller 210 may de-energize the first coil 205 and/or second coil 207 in order to reduce a likelihood of the motor 201 being exposed to a voltage higher than a normal operating voltage. In another example, if the measured voltage is lower than a lower threshold voltage, the controller 210 may de-energize the first coil 205 and/or second coil 207 in order to reduce a likelihood of the motor 201 being exposed to a voltage lower than a normal operating voltage. In this way, the motor may have a threshold operating range between the lower and upper threshold voltages and when a measured voltage is outside this range, the controller may stop operating the motor to reduce degradation to the motor, winch, and/or vehicle to which the winch is coupled.

In yet another example, the motor current sensor may be configured to measure an operating current of the motor 201. The controller may monitor an output of the current sensor and compared the measured current to a threshold current. If the measured current exceeds the threshold current, the controller 210 may de-energize the first coil 205 and/or second coil 207 in order to reduce a likelihood of the motor 201 being exposed to an electrical current higher than a normal operating current.

Additionally, the controller 210 may include instructions stored thereon for recording and storing specific winch events in non-volatile memory of the controller 210. For example, the controller 210 may record and store winch usage data which may include one or more of motor current, temperature, and/or voltage levels throughout winch operation, a direction of rotation of the winch motor, events where motor operation of the winch had to be determined due to the motor temperature, current, and/or voltage exceeding or decreasing below threshold levels (as described above), winch clutch operation, etc. This usage data may be stored in the controller 210 and then referenced during servicing of the winch or via a wireless connection with an external device. In this way, the usage data may be obtained to aid in winch system development, customer service, and/or winch servicing or repair.

In some embodiments, new set points may be loaded into the controller 210, by a user (via a wireless or direct wired connection to the controller via the terminals) to change how the controller adjusts motor operation based on measured voltage, temperature, speed, and/or current. For example, new or updated threshold current, voltage, temperature, and/or speed levels for motor operation may be loaded onto the memory of the controller. As a result, after updating these stored thresholds, the controller 210 may adjust motor operation according to the newly updated thresholds (and not based on the old or previously stored thresholds). In another example, a bootloader may be present to change the application code stored in the controller memory, in the field (e.g., during winch operation and/or when the winch is installed on a vehicle), in order to fix a bug or to provide new functionality for a specific winching application.

FIG. 3A shows a cross-sectional view of the motor 201 and contactor assembly 200 assembled together within the motor housing 105 while FIG. 3B shows an assembled view of the motor assembly 199. As described above with reference to FIG. 2, the armature 204 may rotate around the central axis 190 and is positioned within an interior of the flux ring 206. As shown in FIG. 3A, a first side 360 of the motor 201 is positioned away from the motor end cap 106 and toward the drum 118 (shown by FIG. 1), while a second side 362 is positioned toward the motor end cap 106 and the contactor assembly 200. By positioning and integrating the motor 201 and contactor assembly 200 together within the motor housing 105 as shown by FIGS. 2-3, the contactor assembly 200 may flow electrical current from the power source 175 (shown by FIG. 1) to the armature 204 in order to drive a rotation of the drum 118 as described above. The armature 204 and contactor assembly 200 may be electrically coupled via the brushes 218 (shown by FIG. 2) such that only the single power cable 171 (shown by FIG. 1) electrically couples the power source 175 to the winch 100 (shown by FIG. 1). In this way, an amount of wired electrical connections between the motor 201, contactor assembly 200, and power source 175 may be reduced, thereby increasing an ease of installation and maintenance of components of the winch 100. In some examples, a length of the wired electrical connections may also be reduced by integrating the motor 201 and contactor assembly 200 together relative to a winch in which the contactor assembly is located outside of (e.g., remote from) the motor, thereby reducing a likelihood of wire degradation. FIG. 3B shows an assembled, external view of the motor assembly 199 where the motor housing 105 is formed by the first drum support 110 coupled to the motor end cap 106. The electrical cable 235 coupled to the controller 210 is shown extending outward from the motor housing 105. Further, the electrical terminals 180 also extend outward from the motor housing 105 on the motor end cap 106.

FIGS. 4-5 each show a second embodiment of a motor assembly 490 including a motor 401, a contactor assembly 400, and the motor housing 105. FIG. 4 shows an exploded view of the motor assembly 490, while FIG. 5 shows the motor 401 and contactor assembly 400 assembled together within the motor housing 105. Similar parts shown by FIGS. 1-3 may be labeled similarly and may not be re-introduced below.

The motor 401 includes the flux ring 206 and an armature 402. The armature 402 includes a first portion 432, a second portion 434, and a third portion 436. Similar to the armature 204 shown by FIGS. 2-3, the armature 402 is configured to fit within an inner circumference of the flux ring 206 and to rotate around the central axis 190 in response to energization of coils internal to the armature 402 (e.g., via an interaction of electrical current flowing through the coils with the magnetic field produced by the flux ring 206, described above with reference to FIG. 2). In other words, the central axis 190 is a rotational axis of the motor 401. The third portion 436 has an outer diameter 504 (shown by FIG. 5) less than the inner diameter 331 of the flux ring 206 and may be greater than an outer diameter 502 (shown by FIG. 5) of the second portion 434. The outer diameter 502 of the second portion 434 may be greater than an outer diameter 550 of the first portion 432.

The contactor assembly 400 shown by FIGS. 4-5 includes a brush assembly 409 formed together as a single piece with a contactor housing 424. In other words, the brush assembly 409 and contactor housing 424 are not coupled via one or more fasteners (as in the example of the brush assembly 202 and contactor housing 224 shown by FIGS. 2-3) but instead are molded and/or fused together as a single unit. Further, the brush assembly 409 may be included as part of the contactor housing 224. In alternate embodiments, the brush assembly 409 and contactor housing 224 may be two separate pieces coupled together via a plurality of fasteners (e.g., bolts). A plurality of brushes 406 are coupled with the brush assembly 202 and positioned radially around the central axis 190. Each of the brushes 406 is urged away from the brush assembly 409 in a direction 422 parallel to the central axis 190 via one or more biasing elements (e.g., springs, not shown). In this configuration, when the motor 401 and contactor assembly 400 are assembled together within the motor housing 105, the brushes 406 are pressed against an end surface 431 of the second portion 434 of the armature 402 and are not pressed against the second portion 434 along an outer circumference 430 of the second portion 434. In other words, the brushes 406 are urged in an axial direction relative to the central axis 190 against the armature 402. The brushes 406 and biasing members may each be formed of electrically conductive materials. In one example, the brushes 406 may be made of carbon and the biasing members may be made of a conductive metal such as copper or steel.

The contactor assembly 400 includes a first coil 405 and a second coil 407 (similar to first coil 205 and second coil 207, respectively, shown by FIGS. 2-3) positioned within an interior of the contactor housing 424. However, in alternate embodiments, the contactor assembly 400 may include two or more coils (such as first coil 405, second coil 407, and an additional, third coil). The first coil 405 is positioned opposite to the second coil 407 in a direction perpendicular to the central axis 190 such that an outer surface of the first coil 405 is a distance 500 (shown by FIG. 5) from an outer surface of the second coil 407. The brush assembly 409 is positioned between the first coil 405 and second coil 407 such that the brush assembly 409 fits within the distance 500 and surrounds the first portion 432 of the armature 402. As described above with reference to the first coil 205 and the second coil 207 shown by FIGS. 2-3, the first coil 405 and/or second coil 407 may be energized in order to flow electrical current through the brushes 406 of the contactor assembly 400 and into the armature 402. In one example, energization of the first coil 405 and/or second coil 407 may apply a magnetic force to components internal to the contactor housing 424 in order to close an electrical circuit between the brushes 406, the power source 175 (shown by FIG. 1) and the armature, thereby flowing electrical current from the power source 175 to the brushes 406 and to the motor (and therefore, the armature 402) via the contactor assembly 400.

As described above with reference to FIGS. 2-3, the controller 210 may include instructions stored in non-transitory memory to energize or de-energize the first coil 405 and/or the second coil 407 in response to input from the operator of the winch 100 (shown by FIG. 1). In the example shown by FIGS. 4-5, the controller 210 is coupled to the contactor housing 424 at a first side 426 of the contactor housing 424. The first side 426 is opposite to a second side 428 in the direction of the central axis 190 such that the first side 426 is closer to the motor end cap 106 than the second side 428. The controller 210 may include a plurality of sensors as described above with reference to FIGS. 2-3 and may be configured to adjust winch operation in response to input from the operator of the winch according to the examples described above.

FIG. 5 shows a cross-sectional view of the motor housing 105 with the motor 401 and contactor assembly 400 positioned within the motor housing 105. The armature 402 of the motor 401 is mounted within the motor housing 105 such that the armature 402 may rotate relative to the flux ring 206 and motor housing 105. However, the contactor assembly 400 is mounted within the motor housing 105 such that the contactor assembly is not rotatable relative to the motor housing 105. In the example shown by FIGS. 4-5, a first end 560 of the motor 401 is positioned away from the motor end cap 106 and toward the drum 118 (shown by FIG. 1), while a second end 562 of the motor 401 is positioned opposite to the first end 560 in the direction of the central axis 190 and toward the motor end cap 106 and contactor assembly 400.

A schematic diagram of a motor assembly 600 of a winch (e.g., winch 100 shown by FIG. 1) is shown by FIG. 6. In one example, motor assembly 600 may be a schematic representation of the first embodiment of a motor assembly described above with reference to FIGS. 1-3 or the second embodiment of a motor assembly described above with reference to FIGS. 4-5 (e.g., motor assembly 199 and motor assembly 490, respectively). Motor assembly 600 includes a motor 601 (e.g., similar to motor 201 and motor 401 described above) and a contactor assembly 608 (e.g., similar to contactor assembly 200 and contactor assembly 400 described above) positioned within an interior 603 of a motor housing 622 (e.g., similar to motor housing 105 described above). Motor assembly 600 is shown by FIG. 6 in order to illustrate a relative number and positioning of electrical connections between components of the motor assembly 600 positioned within the interior of the motor housing 622 and components of a winch system positioned outside of the motor housing 622.

Brush assembly 616 (e.g., similar to brush assembly 202 and brush assembly 409 described above), armature 618 (e.g., similar to armature 204 and armature 402 described above), and controller 609 (e.g., similar to controller 210 described above) are each positioned within the interior 603 of the motor housing 622 along with the contactor assembly 608. In some examples, the controller 609 and contactor assembly 608 are coupled together as a single unit. The controller 609 may communicate wirelessly (e.g., receive and/or transmit electromagnetic signals) via wireless signals 624 (e.g., radio waves) with a remote control 626 in order to control an operation of the motor 601 and other components of the winch (as described above with reference to the examples shown by FIGS. 1-5). The controller 609 may also communicate wirelessly via wireless signals 629 (e.g., radio waves) with one or more accessories 627 of the winch. In one example, accessories 627 may include winch lights, lights of a vehicle coupled to the winch, and other types of accessories. Thus, in some examples, the controller 609 may control operation of the motor and/or the accessories 627. The brush assembly 616 is electrically coupled with the contactor assembly 608 by a first electrical connection 612 and a second electrical connection 614. In one example, first electrical connection 612 and second electrical connection 614 are wired electrical connections extending from the contactor assembly 608 to the brush assembly 616. In another example, the first electrical connection 612 and second electrical connection 614 may not be wired electrical connections but may instead be direct electrical connections between conductive contacts of the contactor assembly 608 and conductive contacts of the brush assembly 616. In yet other examples, the contactor assembly may additionally be electrically coupled with a flux ring (e.g., flux ring 206) within the interior 603 of the motor housing 622 via one or more wired electrical connections or direct electrical connections as described above. The armature 618 of the motor 601 may be coupled to a gear set of the winch via a drum 620 (as described above with reference to motor 201 and drum 118 shown by FIG. 1).

The motor may be powered by a power source 602 external to the motor housing 622. In one example, the power source 602 may be a battery of a vehicle (e.g., a vehicle coupled with the winch). The power source 602 transmits electrical energy (e.g., electrical current) to the contactor assembly 608 via a first wired electrical connection 604 and a second wired electrical connection 606. In some examples, first wired electrical connection 604 and second wired electrical connection 606 may be bundled together as a single wire harness. The first wired electrical connection 604 and second wired electrical connection 606 are coupled to terminals 610 (e.g., similar to electrical terminals 180 described above) of the contactor assembly 608. In one example, the terminals 610 are positioned external to the interior 603 of the motor housing 622. As a result, the first wired electrical connection 604 and second wired electrical connection 606 are the only external wired electrical connections (e.g., external to the interior 603) coupled to the contactor assembly 608. No other electrical connections external to the interior 603 are coupled to the contactor assembly 608, brush assembly 616, armature 618, or controller 609.

In an alternate embodiment, the contactor assemblies described above may be mounted around a motor of the winch. For example, as shown in FIGS. 7-9, a contactor 702 may be mounted against and around a portion of a motor 704 of a winch. Specifically, FIGS. 7-9 show a motor assembly 700 for a winch, such as the winch 100 shown in FIG. 1. In this way, the motor assembly 700 may be the motor assembly 199 shown in FIG. 1, in one embodiment. The motor assembly 700 includes the motor 704 coupled to a drum support 706 of the winch (which may be similar to first drum support 110 shown in FIG. 1), the contactor 702 mounted around a portion of an outer surface 708 of the motor 704, and an electrical terminal cover 710 coupled to an end of the contactor 702 and around a portion of the outer surface 708 of the motor 704. The electrical terminal cover 710 includes a contoured surface 711 and the outer cylindrical surface of the motor 704 fits (e.g., sits) within and against the contoured surface 711.

In one example, the motor 704 may include an armature and flux ring housed within the outer housing (formed by outer surface 708) of the motor 704. Thus, in some embodiments motor 704 may include similar components to the motors described above with reference to FIGS. 1-6. In other embodiments, the motor 704 may be an alternate type of motor adapted to operate with the contactor 702. The contactor 702 may include a contactor assembly housed within an outer casing (e.g., housing) 712 of the contactor 702. The contactor assembly may include two or more coils (such as coils 205 and 207 shown in FIG. 2) spaced apart from one another within an interior of the contactor 702. The contactor assembly may be one of, or include similar components as, the contactor assemblies described herein, such as contactor assembly 200 shown in FIGS. 2-3 or contactor assembly 400 shown in FIGS. 4-5.

By spacing the two or more coils apart from one another within the contactor 702, the contactor may be shaped to mount around a portion of the motor 704. For example, as shown in FIG. 7, the contactor 702 has a saddle shape with a contoured, concave inner surface 714 that is shaped to fit against the complementary contoured, convex outer surface 708 of the motor 704. In this way, the concave inner surface 714 may have face-sharing contact with the outer surface 708 when the motor 704 and contactor 702 and coupled to (or fit against) one another. The convex outer surface 708 has sidewalls that curve around a portion of an outer circumference of outer surface 708. Specifically, as shown in FIG. 7, the contactor 702 couples around a bottom surface of the outer surface 708 (with respect to a vertical direction and a surface on which the winch sits). However, in alternate embodiments, the contactor 702 may couple around a side or top portion of the outer surface 708 (e.g., such that the contactor 702 is oriented above or to the left or right side of the motor 704 instead of below the motor 704, as shown in FIGS. 7-9).

Contactor 702 includes a plurality of electrical connections (e.g., terminals) extending outward from an outer end wall 716 of the housing of the contactor 702, where the outer end wall 716 is arranged normal to a central axis of the motor 704 and faces an outer end of the motor assembly 700 (e.g., an end of the motor assembly that is positioned furthest away from a drum of the winch and arranged opposite the drum support 706). Specifically, as shown in FIG. 7, the contactor 702 includes electrical motor connections 720 and battery connections 722 which are separated from one another (e.g., divided) along the outer end wall 716 and covered (e.g., capped or enclosed) by the terminal cover 710. As such, these separate electrical connections may be protected from outside contact and from contact with one another. The battery connections 722 may be adapted to couple to one or more wires or electrical coupling elements coupled to a power source, such as a vehicle battery or control unit of the winch. The electrical motor connections 720 may couple to wires or bus bars coupled to and extending from the motor 704. For example, as shown in FIG. 7, the motor assembly 700 includes bus bars (or may alternatively be wired connections) 724 which directly and electrically couple electrical contactor connections 726 of the motor 704 to the electrical motor connections 720 of the contactor 702. The electrical connections between the motor 704 and contactor 702 are greatly reduced in length due to the contactor 702 be coupled directly to and positioned around a portion of the motor 702, within a space (e.g., envelope, as described further below) defined by the drum support 706 (as compared to systems where the contactor is separated from and not in contact with the motor). As shown in FIG. 7, the electrical motor connections 720 extend a short distance away from the end wall 722, in a direction of central axis 718, and the bus bars 724 extend vertically, a short direction toward the electrical motor connections 720, in a direction perpendicular to the central axis 718. Further, the single and same electrical terminal cover 710 covers and encases the electrical motor connections 720, battery connections 722, and electrical contactor connections 726 within the same space.

As shown in FIGS. 7 and 9, the outer casing 712 of the contactor 702 and an inner surface 728 of the drum support 706 include complementary mating features 730 that lock together, thereby, coupling the contactor 702 to the drum support 706. Specifically, as shown in FIG. 7, the drum support 706 includes a first mating feature 732 that depresses into the inner surface 728 (there may be two of the first mating features 732 arranged on the inner surface 728, one on each side of the inner surface 728 relative to central axis 718) and is adapted to receive a complementary, second mating feature 731 (as shown in FIG. 9) that protrudes outward from an inner end wall 734 of the contactor 702.

As shown in FIG. 8, the contactor 702 mounts to the motor 704 while staying within an envelope defined by outer walls 736 of the drum support 706. Specifically, the outer walls 736 of the drum support 706 define an overall width 738 and height 740 of the motor assembly 700. The motor 704, contactor 702, and electrical terminal cover 710, all fit within the bounds defined by the width 738 and height 740. Said another way, an entirety of the contactor 702 and the motor 702 fit within and do not extend outside of the envelope defined by the outer walls 736 of the drum support 706. For example, no part of the contactor 702 and no part of the motor 704 extend beyond the bounds of the drum support 706, as defined by the outer walls 736. As such, the space occupied by the overall motor assembly 700 is reduced and the overall form factor of the winch is maintained at a desired size. In some embodiments, the motor 704, contactor 702, and electrical terminal cover 710 may all be positioned (e.g., enclosed) within a motor housing of the motor assembly 700. For example, as shown in FIG. 1, a motor end cap (such as motor end cap 106) may be positioned around the motor 704 and contactor 702 and couples to drum support 706. In this way, the motor 704 and contactor 702 may be positioned within a same housing. In other examples, the electrical terminal cover 710 may be shaped to be positioned around the motor 704 and contactor 702 and couple to the drum support 706, and may be referred to as a motor end cap.

FIGS. 10A-10E each show different views of a motor housing 1000 for a winch (e.g., a winch similar to the winch 100 shown by FIG. 1 and described above). The motor housing 1000 includes a drum support 1002 and a motor end cap 1004 (e.g., similar to the examples of the drum support 110 and motor end cap 106 described above). The motor end cap 1004 may be referred to herein as an electrical terminal cover. The drum support 1002 and the motor end cap 1004 are coupleable to each other. In the example shown by FIGS. 10A-10E, the motor end cap 1004 and the drum support 1002 are coupled (e.g., mounted) together via a plurality of fasteners 1003 (e.g., bolts, rivets, etc.). In other examples, the motor end cap 1004 and drum support 1002 may be coupled together in a different way (e.g., via one or more clamps, adhesives, fused together, etc.). Reference axes 1099 are included by FIGS. 10A-13 for comparison of the views shown.

The motor housing 1000 includes a motor 1280 disposed therein, the components of which are described further below with reference to FIGS. 11A-13. However, in the views shown by FIGS. 10A-10C, a spindle 1006 of the motor is shown projecting from the drum support 1002. During conditions in which the motor within the motor housing 1000 is adjusted to an operational mode (e.g., a mode in which the motor is on and is energized by a power source, such as a battery), the spindle 1006 may be driven by the motor in order to rotate a drum of the winch. In some examples, the drum of the winch may be supported by the drum support 1002. The drum support may maintain a position of the drum relative to other components of the winch, such as the motor housing 1000, and may be coupled to the drum such that the drum may rotate relative to the motor housing 1000 during conditions in which the motor drives the spindle 1006 (e.g., rotates the spindle 1006).

Figure 10A:
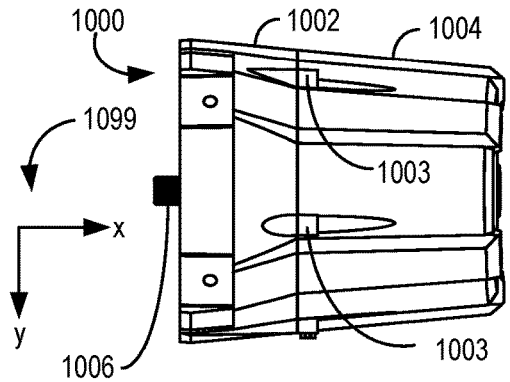
FIGS. 10A-10E each show different views of a motor housing for a motor of a winch.
Figure 10D:
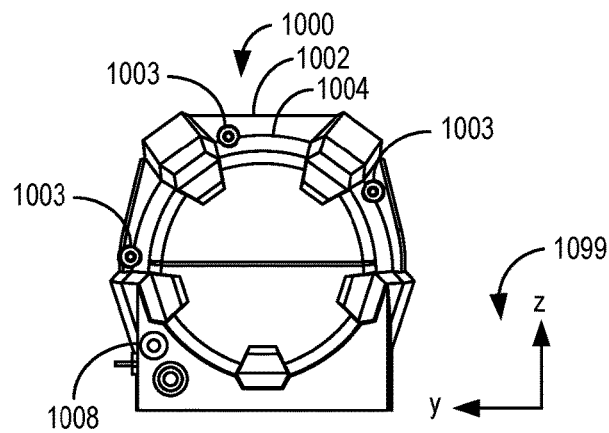
Figure 10B:
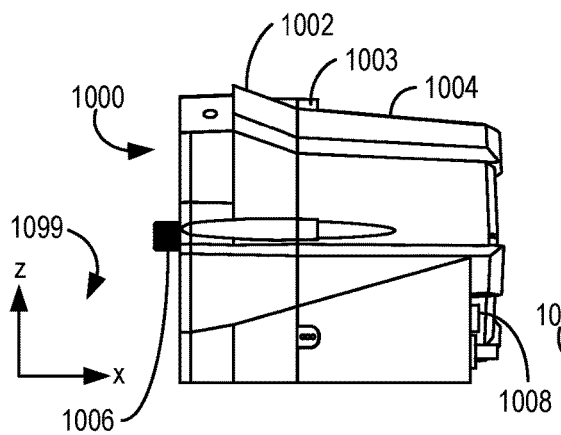
Figure 10E:
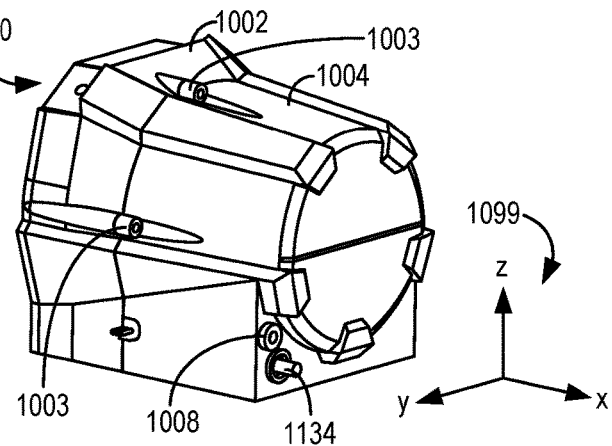
Figure 10C:
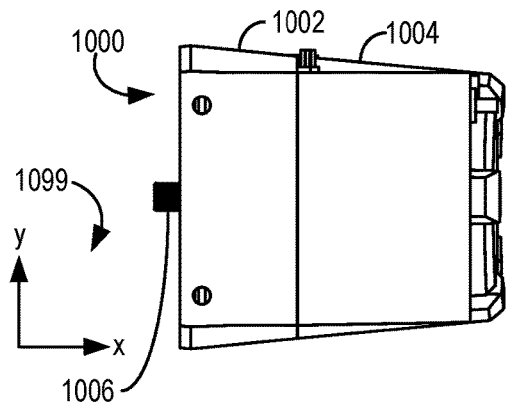

FIG. 10B and FIGS. 10D-10E additionally show a ground connection 1008 (e.g., electrical ground input) of the motor housing 1000. The ground connection 1008 is positioned at the motor end cap 1004 and, in some examples, may protrude from the motor end cap 1004. The ground connection 1008 may be a terminal (e.g. a post) adapted to couple to a wire, such as a wire from a battery of a vehicle (e.g., a vehicle coupled to the winch including the motor housing 1000). The ground connection 1008 is an electrically grounded component of the motor housing 1000, with an electrical voltage at the ground connection 1008 being approximately 0 V. In some examples, the ground connection 1008 may be formed by a contactor 1106 positioned within the motor housing 1000, described below.

Figure 11A:
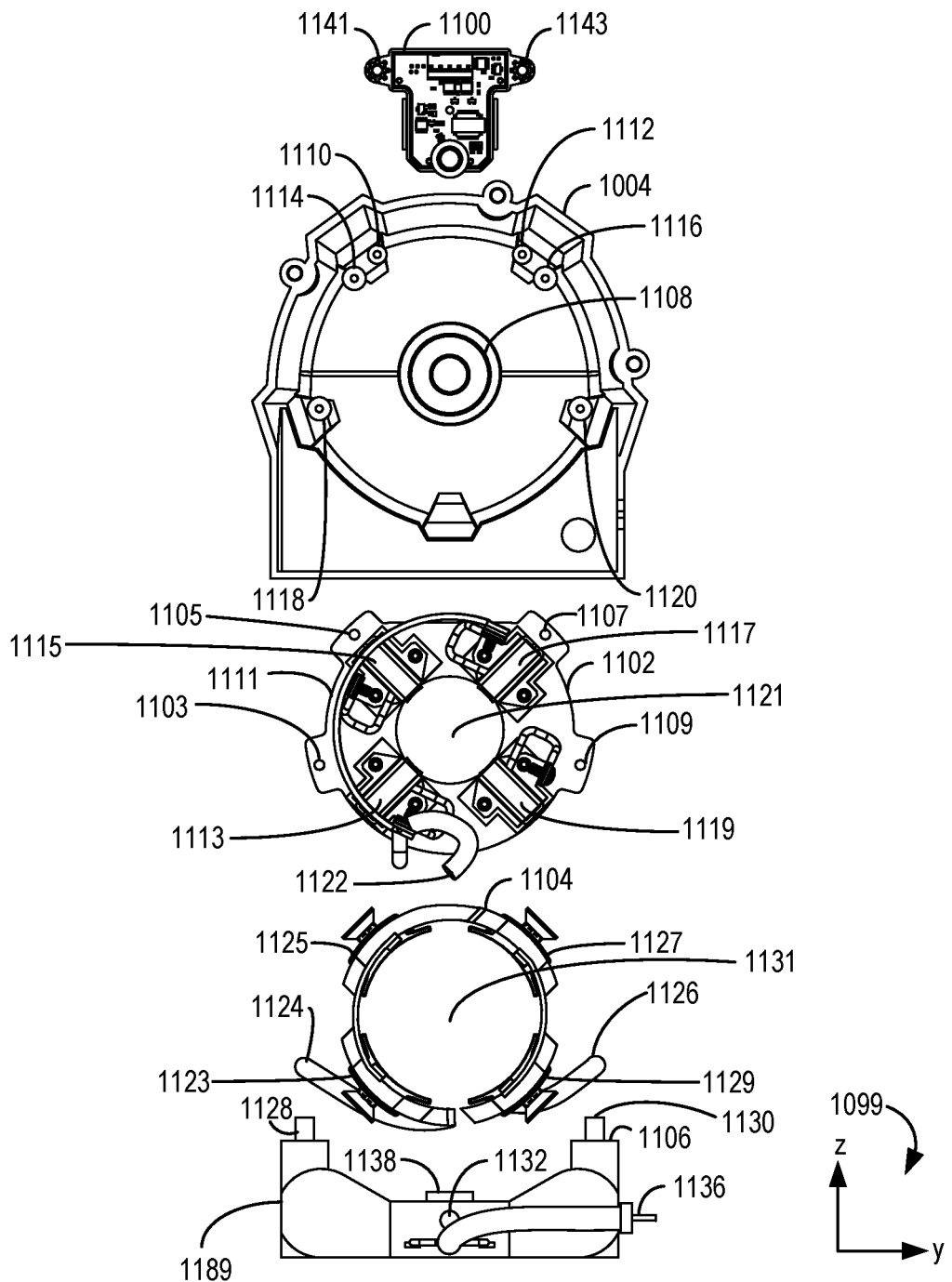
FIGS. 11A-11B each show different views of components disposed within the motor housing of FIGS. 10A-10E, with the components removed from the motor housing.
Figure 11B:
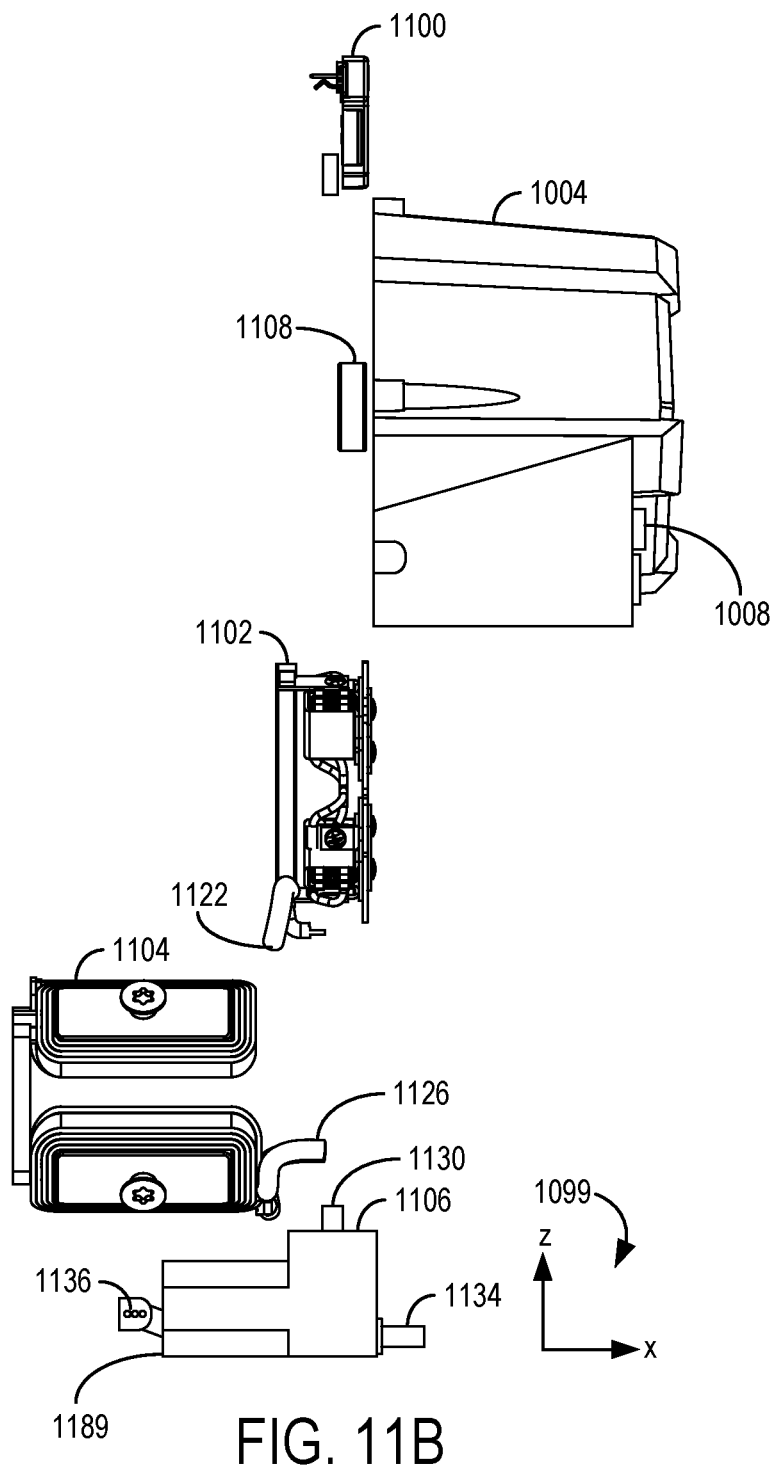

FIG. 11A shows a first view of the motor end cap 1004 with the drum support 1002 removed. In the view shown by FIG. 11A, several components of the motor 1280 disposed within the motor housing 1000 are shown separated from the motor housing 1000. For example, FIG. 11A shows a control module 1100 (which may be referred to herein as a controller), a brush plate assembly 1102 (which may be referred to herein as a brush assembly), a field coil array 1104, and the contactor 1106. The control module 1100, the brush plate assembly 1102, the field coil array 1104, and the contactor 1106 are each shaped to fit within the motor housing 1000 during conditions in which the motor end cap 1004 is coupled to the drum support 1002 (shown by FIGS. 10A-10E and described above). For example, the brush plate assembly 1102 includes a first opening 1103, a second opening 1105, a third opening 1107, and a fourth opening 1109. The first opening 1103, the second opening 1105, the third opening 1107, and the fourth opening 1109 may each be a through-hole (e.g., aperture) formed by a brush plate 1111 of the brush plate assembly 1102. The brush plate 1111 may couple to an interior of the motor end cap 1004 by aligning each of the first opening 1103, the second opening 1105, the third opening 1107, and the fourth opening 1109 with respective plate mounts of the motor end cap 1004. Specifically, during conditions in which the brush plate 1111 is positioned within the interior of the motor end cap 1004, the first opening 1103 may be aligned with a first brush mount 1118 of the motor end cap 1004, the second opening 1105 may be aligned with a second brush mount 1114, the third opening 1107 may be aligned with a third brush mount 1116, and the fourth opening 1109 may be aligned with a fourth brush mount 1120. The first brush mount 1118, the second brush mount 1114, the third brush mount 1116, and the fourth brush mount 1120 may each be an opening (e.g., a blind hole, aperture, etc.) formed by the motor end cap 1004. In some examples, a diameter of each of the brush mounts (e.g., an amount of opening of each brush mount) may be a same amount as a diameter of each opening of the brush plate 1111 (e.g., first opening 1103, second opening 1105, third opening 1107, and fourth opening 1109). In other examples, one or more of the openings of the brush plate 1111 may have a different diameter relative to each other opening of the brush plate 1111, and the respective brush mounts of the motor end cap 1004 to which the openings of the brush plate 1111 are configured to align may have similar relative diameters. For example, the second opening 1105 may be larger than the other openings of the brush plate 1111, and the second brush mount 1114 may be correspondingly larger than the other brush mounts of the motor end cap 1004. Other example configurations are possible. In order to couple the brush plate 1111 to the motor end cap 1004, a fastener (e.g., bolt) may be inserted through each opening of the brush plate 1111 and each corresponding brush mount of the motor end cap 1004. For example, a first fastener may be inserted through both of the first opening 1103 and the first brush mount 1118, a second fastener may be inserted through both of the second opening 1105 and the second brush mount 1114, etc. In some examples, the fasteners may be threaded fasteners, and in other examples, the fasteners may not be threaded.

The brush plate assembly 1102 includes a plurality of conductive brushes coupled to the brush plate 1111. In the examples described herein with reference to FIGS. 11A-13, the brush plate assembly 1102 includes four electrically-conductive brushes (e.g., first brush 1113, second brush 1115, third brush 1117, and fourth brush 1119), with each being positioned in a radial arrangement around the brush plate 1111 and being biased (e.g., urged) in a radial direction of a central opening 1121 of the brush plate 1111 (e.g., a radial direction relative to central axis 1005) by a biasing member (e.g., a spring). In this configuration, a portion of an armature 1200 of the motor (shown by FIGS. 12-13 and described further below) is positioned within the central opening 1121, and the conductive brushes are biased into face-sharing contact with the armature around the central opening 1121. In other examples, the brush plate assembly 1102 may include a different number of electrically-conductive brushes (e.g., two, three, five, eight, etc.) and/or may include a different relative arrangement of the conductive brushes. For example, each of the conductive brushes may be biased (e.g., urged) in an axial direction of the armature toward an end surface of the armature and parallel to a rotational axis of the armature (and parallel to central axis 1005) by a biasing member (e.g., a spring), similar to the example shown by FIGS. 4-5 and described above. In the axial configuration (e.g., the configuration described above in which the conductive brushes are biased in the axial direction toward the end surface of the armature), the conductive brushes are configured to be positioned in face-sharing contact with the end surface of the armature.

The brush plate assembly 1102 additionally includes a connector 1122 (e.g., a wire, wire harness, electrically conductive cable, etc., configured to electrically couple the conductive brushes of the brush plate assembly 1102 to the contactor 1106. The connector 1122 is coupled in direct, face-sharing contact with a corresponding connector 1132 of the contactor 1106 (which may be referred to herein as an electrical connection). In one example, the connector 1132 of the contactor 1106 may be a terminal (e.g., an electrically conductive post), and the connector 1122 of the brush plate assembly 1102 may be wrapped around the connector 1132, fused (e.g., welded, soldered, etc.) with the connector 1132, etc. In other examples, the connector 1122 of the brush plate assembly 1102 and the connector 1132 of the contactor 1106 may be formed together as a single piece (e.g., a solid bar of electrically conductive material, such as copper).

The contactor 1106 may include a contactor assembly housed within an outer casing (e.g., housing) 1189 of the contactor 1106. The contactor assembly may include two or more coils (such as coils 205 and 207 shown in FIG. 2) spaced apart from one another within an interior of the contactor 1106 and arranged opposite one another across central axis 1005 of the contactor 1106. The coils disposed within the interior of the contactor 1106 (e.g., within the outer casing 1189) may be referred to herein as contactor coils.

The contactor 1106 is additionally electrically coupled to the field coil array 1104 by a first field terminal 1128 and a second field terminal 1130 (which may be referred to herein as electrical connections). The first field terminal 1128 is directly coupled in face-sharing contact with a first connector 1124 of the field coil array 1104, and the second field terminal 1130 is directly coupled in face-sharing contact with a second connector 1126 of the field coil array 1104. In some examples, similar to the example described above with reference to the connector 1122 of the brush plate assembly 1102 and the connector 1132, the first field terminal 1128 and the first connector 1124 may be formed together as a single piece, and/or the second field terminal 1130 and the second connector 1126 may be formed together as a single piece.

The field coil array 1104 includes a plurality of field coils configured to produce a magnetic field between each of the field coils. The field coil array 1104 is enclosed by flux ring 1204. The flux ring 1204 may be a cylindrical structure shaped to house the field coil array 1104. In some examples, the flux ring 1204 may be formed of a ferrous, metallic material (e.g., iron), and the flux ring 1204 may increase an intensity (e.g., an amplitude) of the magnetic field produced by the field coils of the field coil array 1104. The motor may be supported partially by the contactor 1106, with a bottom end 1273 of the flux ring 1204 being seated against (and partially surrounded by) a top end 1271 of the contactor 1106. Said another way, the motor 1280 is supported by the outer casing 1189 and is partially surrounded by the outer casing 1189, with the flux ring 1204 being positioned in face-sharing contact with an outer surface of the outer casing 1189 at the top end 1271.

Figure 12:
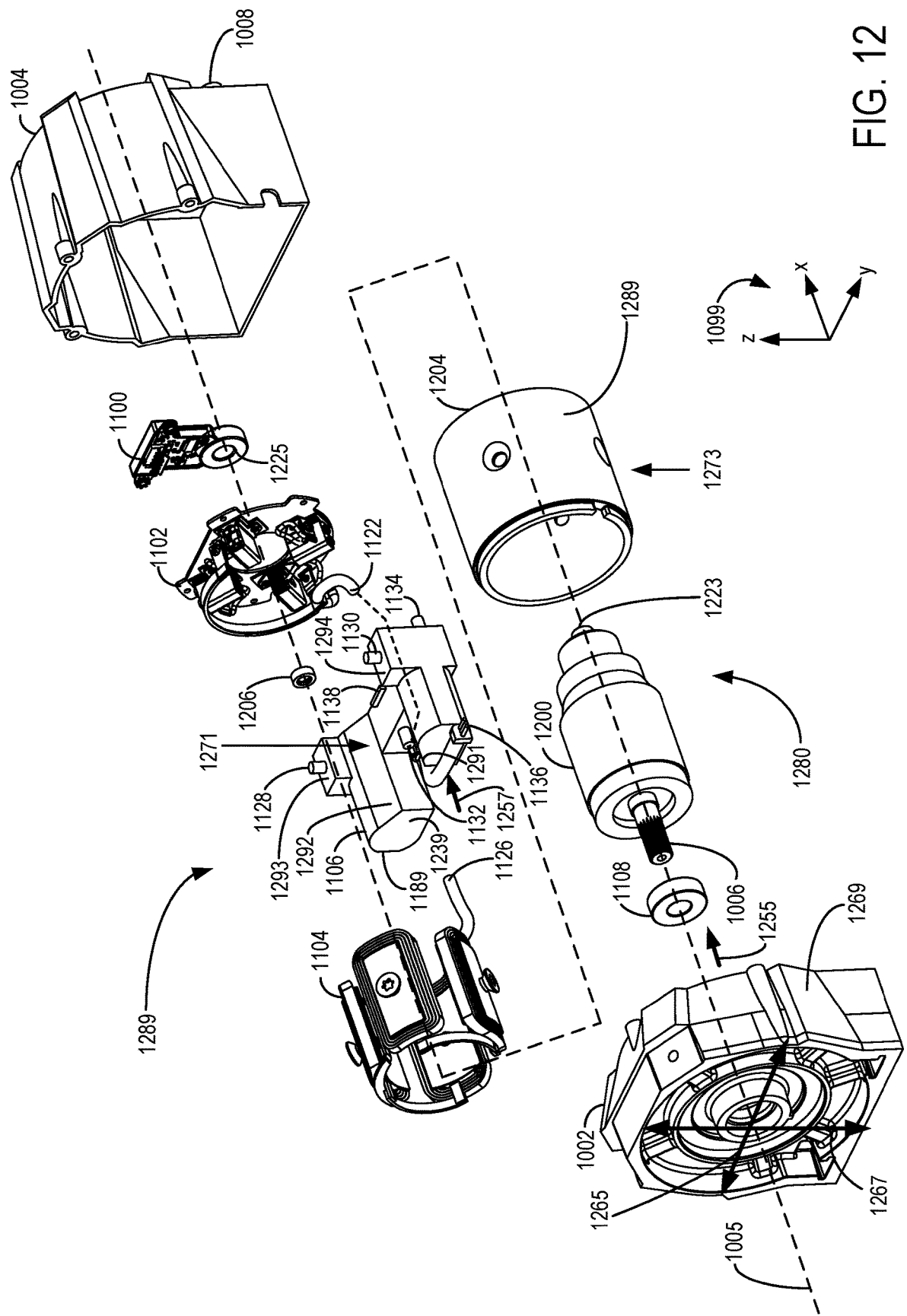
FIG. 12 shows a first exploded view of the motor and components of the motor housing of FIGS. 10A-10E.
Figure 13:
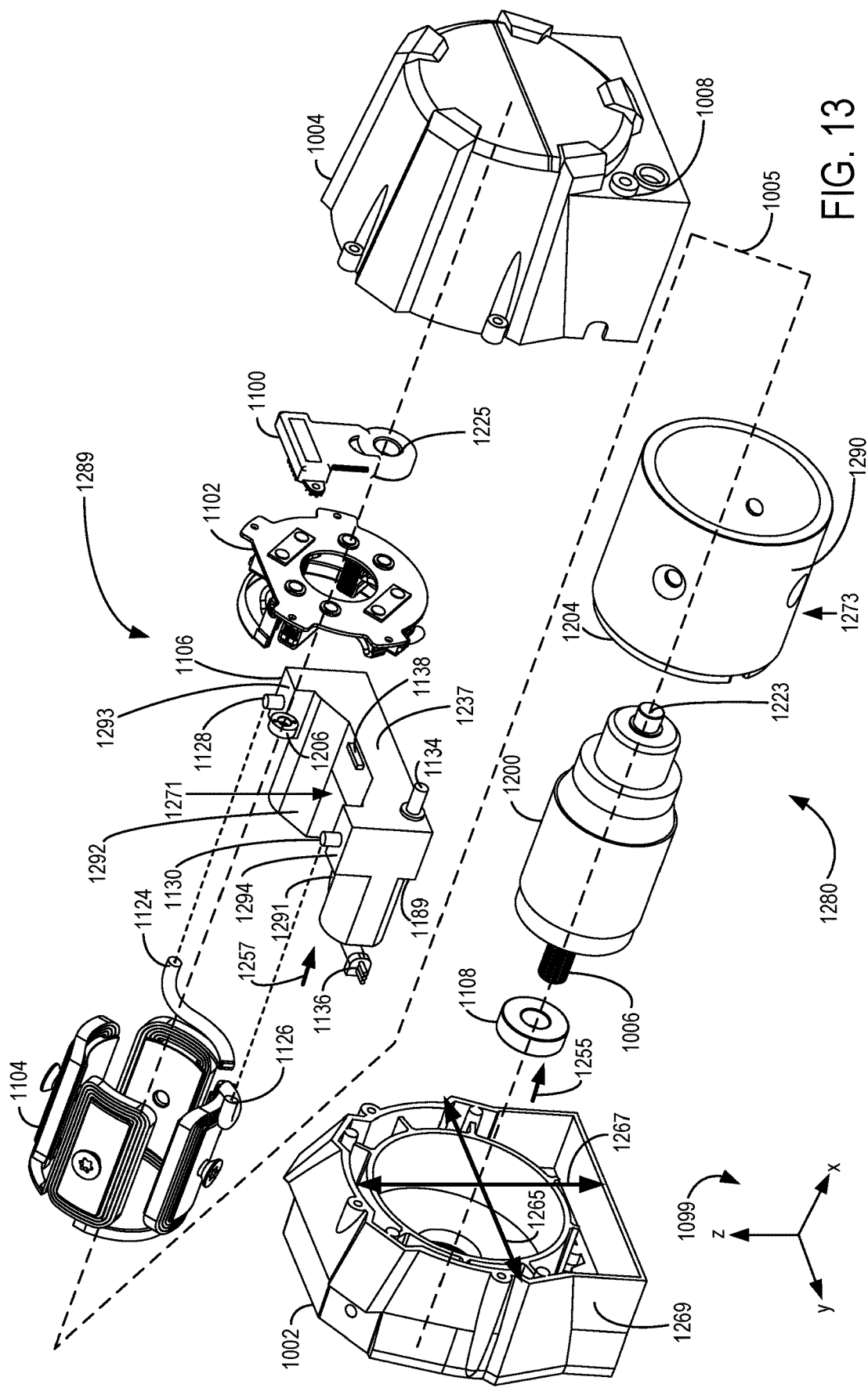
FIG. 13 shows a second exploded view of the motor and components of the motor housing of FIGS. 10A-10E.

In the example shown by FIGS. 11A-13, the field coil array 1104 includes four field coils. Specifically, the field coil array 1104 includes a first field coil 1123, a second field coil 1125, a third field coil 1127, and a fourth field coil 1129. In other examples, the field coil array 1104 may include a different number of field coils (e.g., two, six, eight, etc.). The field coil array 1104 includes a central opening 1131 shaped to receive and surround the armature 1200 (shown by FIGS. 12-13). The field coils of the field coil array 1104 may be selectively energized via the contactor 1106 in order to produce the magnetic field in a region of the armature 1200. For example, as shown by FIG. 11B and FIGS. 12-13, the contactor 1106 includes a power terminal 1134 (e.g., electrical power input) positioned at an end of the contactor 1106 opposite to the connector 1132. The power terminal 1134 is configured to be electrically coupled to a power source (e.g., a battery of a vehicle). In one example, the power source may be connected to the power terminal 1134 via a single wire, wire harness, cable, etc.

Although the power terminal 1134 is configured to be maintained in electrical communication with the power source (e.g., a voltage at the power terminal 1134 may be maintained at a non-zero voltage value by the power source), the contactor 1106 is configured to electrically isolate the power source from the field coils of the field coil array 1104 and the conductive brushes of the brush plate assembly 1102 during conditions in which the motor is in an non-operational mode (e.g., during a condition in which the contactor coils are not energized).

For example, similar to the example of the control module 1100 described above, energization of the brushes of the brush plate assembly 1102 and/or the field coils of the field coil array 1104 may be controlled by the control module 1100, with the control module 1100 being positioned within the motor housing 1000. Specifically, the control module 1100 may include one or more openings (e.g., apertures) positioned to align with one or more corresponding controller mounts of the motor end cap 1004. As shown by FIG. 11A, the control module 1100 includes a first opening 1141 and a second opening 1143, with the first opening 1141 positioned to align with a first controller mount 1110 of the motor end cap 1004, and with the second opening 1143 positioned to align with a second controller mount 1112. Similar to the examples described above with reference to the openings of the brush plate 1111 and the brush mounts of the motor end cap 1004, fasteners may be inserted through the openings of the control module 1100 and the corresponding controller mounts of the motor end cap 1004 in order to couple the control module 1100 to the motor end cap 1004. Specifically, a first fastener may be inserted through the first opening 1141 and the first controller mount 1110, and a second fastener may be inserted through the second opening 1143 and the second controller mount 1112. The fasteners may be threaded fasteners, or in other examples the fasteners may not be threaded. In some examples, the outer casing 1189 of the contactor 1106 may be coupled to the motor end cap 1004 in a similar way (e.g., via one or more fasteners). In other examples, the outer casing 1189 may be coupled to the motor end cap 1004 via one or more features of the outer casing 1189 shaped to mate (e.g., engage) with one or more counterpart features of the motor end cap 1004.

The control module 1100 may include instructions stored in non-transitory memory to energize the field coils of the field coil array 1104 and/or the brushes of the brush plate assembly 1102 in response to input by an operator of the winch (e.g., the winch including the motor housing 1000, similar to winch 100 shown by FIG. 1). In one example, energizing the field coils of the field coil array 1104 and/or brushes of the brush plate assembly 1102 may include energizing the contactor coils positioned within the outer casing 1189 of the contactor 1106 in order to move one or more components (e.g., switches) within the outer casing 1189 and complete an electrical circuit within the contactor 1106 between the field coils, brushes, and the power source (e.g., connect the power source to the field coils and brushes via the contactor 1106 and adjust the motor to an operational mode). In another example, de-energizing the field coils of the field coil array 1104 and/or brushes of the brush plate assembly 1102 may include de-energizing the contactor coils in order to move the one or more components within the outer casing 1189 and disconnect the power source from the field coils and/or brushes (e.g., adjust the motor to the non-operational mode).

In some examples, the control module 1100 may be in wireless communication with one or more devices external to the winch and the motor housing 1000. In some examples, the control module 1100 may control operation of one or more accessories of the winch (e.g., winch lights, lights of a vehicle coupled to the winch, etc.), as described above with reference to controller 210 and controller 609. In another example, the operator of the winch may interface with a remote control (or another remote controller device such as a wired remote, wireless remote, a vehicle system controller, or the like) in order to send a wireless signal (e.g., radio wave signal) to the control module 1100 indicating that a rotation of a drum of the winch (e.g., similar to drum 118 shown by FIG. 1) in a first direction is desired by the operator. The control module 1100 may then energize the field coils of the field coil array 1104 to produce the magnetic field at the armature 1200, and may energize the brushes of the brush plate assembly 1102 in order to flow electrical current through the brushes and into the armature 1200. The magnetic field produced by the field coils may interact with the energized armature in order to rotate the armature within the motor housing 1000 (e.g., rotate the armature 1200 around central axis 1005 of the armature 1200, with the armature 1200 coupled to the drum support 1002 via bearing 1108 positioned around spindle 1006), with the rotating armature driving a gear reduction unit of the winch (e.g., gear reduction unit positioned within a gear housing of the winch, similar to gear housing 126) to rotate the drum in the first direction. The central axis 1005 of the armature 1200 may be referred to herein as the central axis of the contactor assembly and the motor. In another example, the operator of the winch may interface with the remote control in order to send a wireless signal to the control module 1100 indicating that a rotation of the drum in a second direction opposite to the first direction is desired by the operator. The control module 1100 may then energize the field coils of the field coil array 1104 to produce the magnetic field at the armature 1200, and may energize the brushes of the brush plate assembly 1102 in order to flow electrical current through the brushes and into the armature 1200. The magnetic field produced by the field coils may interact with the energized armature in order to rotate the armature within the motor housing 1000, with the rotating armature driving a gear reduction unit of the winch to rotate the drum in the second direction.

In some examples, the control module 1100 may include a motor speed sensor, motor current sensor, voltage sensor, motor direction sensor, motor position sensor, drum rotation sensor, and/or motor temperature sensor, and the control module 1100 may be configured to receive and/or transmit wired and/or wireless signals from/to a controller area network (CAN) and/or winch accessories (e.g., an electric free spooling clutch actuator). In the example shown by FIGS. 11A-13, the control module 1100 is configured to be directly electrically connected to the contactor 1106 via a controller connector 1138 of the contactor 1106. The control module 1100 may receive electrical power from the power source via the controller connector 1138 of the contactor 1106 protruding from the outer casing 1189. In one example, the control module 1100 may be plugged directly onto the controller connector 1138 of the contactor 1106 (e.g., the control module 1100 may include a port adapted to seat the control module 1100 on the contactor 1106 and receive electrical power from the controller connector 1138).

The control module 1100 may additionally be electrically coupled to a motor sensor 1206 (shown by FIGS. 12-13). The motor sensor 1206 (which may be referred to herein as a motor speed and position sensor) may be coupled to a first end 1223 of the armature 1200 (e.g., inserted onto the first end 1223 along the central axis 1005 of the armature 1200) and may be housed within an annular portion 1225 of the control module 1100. The annular portion 1225 of the control module 1100 may include one or more electrically conductive contacts (e.g., surfaces) configured to transmit electrical signals from the motor sensor 1206 to the control module 1100. The motor sensor 1206 may sense a speed and/or position of the armature 1200 relative to the contactor housing 1000 and send electrical signals to the control module 1100 to indicate the speed and/or position of the armature 1200. For example, the motor sensor 1206 may be adapted to measure one or more of a rotational speed of the motor, a direction of rotation of the motor, and a position of the motor.

The control module 1100 may include instructions stored thereon for adjusting operation of the motor in response to an output of the motor sensor and/or one or more other sensors of the motor, such as a temperature sensor, current sensor, voltage sensor, and/or signals from the remote control (similar to the example described above with reference to the motor 201). In one example, the temperature sensor, current sensor, and/or voltage sensor may be directly integrated into the control module 1100.

The temperature sensor may be configured to measure a temperature of the motor. In one example, the control module 1100 may monitor (e.g., measure) an output of the temperature sensor and compare the measured temperature to a threshold temperature. If the measured temperature exceeds the threshold temperature, the controller may de-energize (e.g., turn off) the motor in order to reduce the temperature of the motor. By integrating the temperature sensor into the control module 1100, the temperature sensor may measure the temperature of the motor, and the control module 1100 may directly interpret the measured temperature from the temperature sensor without additional electrical connections. Similarly, by housing the motor sensor 1206 within the annular portion 1225 of the control module 1100, the control module 1100 may directly interpret the speed and/or position of the motor from the motor sensor 1206 without additional electrical connections.

In another example, the voltage sensor may be configured to measure an operating voltage (e.g., 12 volts, 24 volts, 36 volts, or 48 volts, in some examples) of the motor. The control module 1100 may monitor (e.g., measure) an output of the voltage sensor and compare the measured voltage to an upper threshold voltage. If the measured voltage exceeds the upper threshold voltage, the control module 1100 may de-energize the field coils of the field coil array 1104 and/or the conductive brushes of the 1102 via the contactor 1106 in order to reduce a likelihood of the motor being exposed to a voltage higher than a normal operating voltage. In another example, if the measured voltage is lower than a lower threshold voltage, the control module 1100 may de-energize the field coils of the field coil array 1104 and/or the conductive brushes of the 1102 via the contactor 1106 in order to reduce a likelihood of the motor being exposed to a voltage lower than a normal operating voltage. In one example, the normal operating voltage may be 12 volts, and the corresponding lower threshold voltage and upper threshold voltage may be 9 volts and 16 volts, respectively. In another example, the normal operating voltage may be 24 volts, and the corresponding lower threshold voltage and upper threshold voltage may be 18 volts and 32 volts, respectively. In yet another example, the normal operating voltage may be 36 volts, and the corresponding lower threshold voltage and upper threshold voltage may be 27 volts and 48 volts, respectively. In yet another example, the normal operating voltage may be 48 volts, and the corresponding lower threshold voltage and upper threshold voltage may be 36 volts and 64 volts, respectively. In this way, the motor may have a threshold operating range between the lower and upper threshold voltages and when a measured voltage is outside this range, the control module may stop operating the motor to reduce degradation to the motor, winch, and/or vehicle to which the winch is coupled.

In yet another example, the motor current sensor may be configured to measure an operating current of the motor. The control module 1100 may monitor an output of the current sensor and compare the measured current to a threshold current. If the measured current exceeds the threshold current, the control module 1100 may de-energize the field coils of the field coil array 1104 and/or the conductive brushes of the 1102 via the contactor 1106 in order to reduce a likelihood of the motor being exposed to an electrical current higher than a normal operating current.

Additionally, the control module 1100 may include instructions stored thereon for recording and storing specific winch events in non-volatile memory of the control module 1100. For example, the control module 1100 may record and store winch usage data which may include one or more of motor current, temperature, and/or voltage levels throughout winch operation, a direction of rotation of the winch motor, events where motor operation of the winch had to be determined due to the motor temperature, current, and/or voltage exceeding or decreasing below threshold levels (as described above), winch clutch operation, etc. This usage data may be stored in the control module 1100 and then referenced during servicing of the winch or via a wireless connection with an external device. In this way, the usage data may be obtained to aid in winch system development, customer service, and/or winch servicing or repair.

In some embodiments, new set points may be loaded into the control module 1100, by a user (via a wireless or direct wired connection to the controller via the terminals) to change how the controller adjusts motor operation based on measured voltage, temperature, speed, and/or current. For example, new or updated threshold current, voltage, temperature, and/or speed levels for motor operation may be loaded onto the memory of the controller. As a result, after updating these stored thresholds, the control module 1100 may adjust motor operation according to the newly updated thresholds (and not based on the old or previously stored thresholds). In another example, a bootloader may be present to change the application code stored in the controller memory, in the field (e.g., during winch operation and/or when the winch is installed on a vehicle), in order to fix a bug or to provide new functionality for a specific winching application.

In the example shown by FIGS. 11A-13, the contactor 1106 includes a wired remote connection 1136. The wired remote connection 1136 may be electrically coupled to a control panel and/or remote control of the winch, such as the remote control described above. For example, the remote control may be utilized by the operator of the winch in order to adjust the speed of the winch, the direction of the rotation of the drum of the winch, etc. In one example, the first end of a wire, wire harness, cable, etc. may be coupled to the wired remote connection 1136, and a second end may be coupled to the remote control and/or control panel. Within an interior of the contactor 1106, the wired remote connection 1136 may be electrically coupled to the controller connector 1138. In this configuration, the control module 1100 may be seated directly on the controller connector 1138, and electrical signals may be transmitted between the control module 1100 and the remote control and/or control panel. For example, the control module 1100 may transmit electrical signals to the remote control and/or control panel by transmitting the electrical signals through the contactor 1106 from the controller connector 1138 to the wired remote connection 1136. In another example, the remote control and/or control panel may transmit electrical signals to the control module 1100 through the contactor 1106 from the wired remote connection 1136 to the controller connector 1138. In yet other examples, the contactor 1106 may not include the wired remote connection 1136.

In the configurations described above with reference to FIGS. 10A-13, there are no additional electrical connections between the contactor 1106 and the motor 1280 outside of the interior of the motor housing. In one example, the only electrical connection of the contactor 1106 and motor 1280 to the power source (e.g., the vehicle battery) that extends outside of the interior of the motor housing 1000 is the electrical connection (e.g., wire, wire harness, cable, etc.) coupling the power terminal 1134 of the contactor 1106 to the power source. The motor 1280 is adapted to receive electrical power via only the contactor 1106, and the power terminal 1134 is the only component electrically coupling the contactor 1106 to the power source.

FIGS. 12-13 show different exploded views of motor assembly 1289 disposed within the motor housing 1000. During conditions in which the motor assembly 1289 is assembled, the contactor 1106 (e.g., contactor assembly) is positioned in face sharing contact with a portion of an outer surface 1290 of the motor 1280 (e.g., the flux ring 1204). Specifically, the outer casing 1189 of the contactor 1106 includes a plurality of inner surfaces positioned in face sharing contact with the outer surface 1290 of the motor 1280, with the outer surface 289 being a cylindrical outer surface of the motor 1280. For example, the outer casing 1189 includes a first angled surface 1291 and a second angled surface 1292 positioned opposite to each other across the central axis 1005. The first angled surface 1291 and the second angled surface 1292 are angled opposite to each other (e.g., angled in opposite directions relative to each other and relative to the central axis 1005). The first angled surface 1291 and the second angled surface 1292 may be referred to herein as inner surfaces. The first angled surface 1291 and the second angled surface 1292 are each planar surfaces (e.g., flat surfaces, without curvature). In other examples, the first angled surface 1291 and/or second angled surface 1292 may be curved (e.g., curving upwards or downwards in a vertical direction relative to a surface on which the winch including the motor assembly 1289 sits). As described above, the bottom end 1273 of the flux ring 1204 is positioned in face-sharing contact with the first angled surface 1291 and the second angled surface 1292. The bottom end 1273 may be referred to herein as a bottom portion of the motor 1280. The bottom end 1273 is the bottom end of the motor 1280 relative to a vertical direction and surface on which the winch that it includes the motor assembly 1289 sits. The contactor 1106 (e.g., contactor assembly) is positioned vertically below the motor 1280 in the vertical direction (e.g., the direction of the z-axis of reference axes 1099).

The contactor 1106 additionally includes outer top walls positioned at the top end 1271. Specifically, the outer casing 1189 of the contactor 1106 includes a first outer top wall 1293 and a second outer top wall 1294. The first outer top wall 1293 is positioned opposite to the second outer top wall 1294 across the central axis 1005. The first outer top wall 1293 and the second outer top wall 1294 are each planar, outer surfaces of the outer casing 1189 of the contactor 1106 (e.g., contactor assembly). The first outer top wall 1293 and the second outer top wall 1294 may be parallel and positioned at a same vertical height (e.g., a same vertical position along the z-axis of reference axes 1099) relative to each other in some examples, such as that shown by FIGS. 12-13 and described herein. In other examples, the first outer top wall 1293 and the second outertop wall 1294 may be positioned at different vertical heights relative to each other and/or may be positioned at an angle relative to each other. The second field terminal 1130 extends upward and outward from the second outer top wall 1294, and the first field terminal 1128 extends upward and outward from the first outer top wall 1293. Specifically, the first field terminal 1128 extends in the vertical direction away from the first outer top wall 1293, and the second field terminal 1130 extends in the vertical direction away from the second outer top wall 1294, with the vertical direction being relative to the surface on which the winch that includes the motor assembly 1289 sits (e.g., the first field terminal 1128 and the second field terminal 1130 extend in a direction away from the outer casing 1189). The first field terminal 1128 and the second field terminal 1130 may be referred to herein as electrical connections. The first field terminal 1128 and the second field terminal 1130 are electrically isolated from one another at the exterior of the outer casing 1189. Said another way, the first field terminal 1128 and the second field terminal 1130 are not directly coupled to each other (e.g., via wires, etc.) outside of the outer casing 1189.

As described above, the contactor 1106 includes the connector 1132. The connector 1132 extends in the axial direction of the central axis 1005 (e.g., extends axially relative to the central axis 1005, with the central axis 1005 being the rotational axis of the motor 1280) away from a first end wall 1237 of the outer casing 1189, with the first end wall 1237 being positioned opposite to a second end wall 1239 of the contactor 1106 along the central axis 1005. The first end wall 1237 may be referred to herein as an outer end wall of the outer casing 1189, and the second end wall 1239 may be referred to herein as an inner end wall of the outer casing 1189 (e.g., of the contactor 1106). The first and second end walls of the contactor 1106 may be planar surfaces of the contactor 1106 (e.g., flat surfaces, and without curvature). The connector 1122 of the brush plate assembly 1102 may be coupled to the connector 1132 of the contactor 1106 by one or more wires extending at least partially in the axial direction of the central axis 1005 (e.g., parallel to the central axis 1005). Similarly, the first field terminal 1128 and the second field terminal 1130 may be coupled to the first connector 1124 and the second connector 1126, respectively, via one or more wires extending at least partially in the axial direction of the central axis 1005. The motor end cap 1004 encloses each of the electrical connections described above (e.g., connector 1132, first field terminal 1128, second field terminal 1130, first connector 1124, second connector 1126, etc.).

The drum support 1002 is coupled to an inner end 1255 of the motor and an inner end 1257 of the contactor 1106. Specifically, the motor 1280 and the contactor 1106 are partially housed within the drum support 1002 and are supported by the drum support 1002 (e.g., at inner end 1255 and inner end 1257). The motor 1280 and the contactor 1106 (e.g., contactor assembly) are contained (e.g., housed) within bounds defined by outer walls 1269 of the drum support 1002. The drum support 1002 has a width 1265 (e.g., in a direction of the y-axis of reference axes 1099) and a height 1267 (e.g., in a direction of the z-axis of reference axes 1099), with the width 1265 and the height 1267 being distances between opposing outer walls 1269 of the drum support 1002. An outer end of the motor 1280, opposite to the inner end 1255, is positioned away from the drum support 1002 and is enclosed entirely by the motor end cap 1004.

In the examples described herein (and shown by FIGS. 12-13), the first angled surface 1291 and the second angled surface 1292 of the contactor 1106 (e.g., of the outer casing 1189) are angled relative to the first end wall 1237 and second end wall 1239. In one example, a line normal (e.g., orthogonal) to the first angled surface 1291 may be perpendicular to both of the first end wall and the second end wall (e.g., perpendicular to a line normal to the first end wall 1237 and the second end wall 1239). Similarly, a line normal to the second angled surface 1292 may be perpendicular to both of the first end wall and the second end wall (e.g., perpendicular to the line normal to the first end wall 1237 and the second end wall 1239).

The technical effect of coupling the motor and contactor assembly together within the motor housing and/or together within a space defined by a drum support of the motor assembly, according to the examples shown by FIGS. 1-13 and described above, is to reduce an amount of wired electrical connections (e.g., external wired electrical connections that are external to the motor housing) between the power source, the contactor assembly, and the motor. The winch may be powered via a single power cable coupled to the terminals of the contactor assembly, with the brushes of the contactor assembly flowing electrical current from the power source to the armature of the motor. In this way, the winch may be more easily maintained, and an ease of winch component installation may be increased.

FIGS. 1-5 and FIGS. 7-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example.

In one embodiment, a motor assembly for a winch comprises: a motor; and a contactor assembly coupled around and in face-sharing contact with a portion of an outer surface of the motor, the contactor assembly including two or more coils spaced apart from one another within the contactor assembly. In a first example of the motor assembly, components of the contactor assembly, including the two or more coils, are housed within an outer casing of the contactor assembly and the outer casing includes a plurality of inner surfaces in face-sharing contact with a cylindrical outer surface of the motor. A second example of the motor assembly optionally includes the first example, and further includes wherein the plurality of inner surfaces of the outer casing includes first and second planar surfaces that support a portion of the cylindrical outer surface of the motor, the first and second planar surfaces being angled relative to each other. A third example of the motor assembly optionally includes one or both of the first and second examples, and further includes wherein the portion of the cylindrical outer surface of the motor is a bottom portion relative to a vertical direction and surface on which a winch to which the motor assembly is coupled sits and wherein the contactor assembly is positioned vertically below the motor. A fourth example of the motor assembly optionally includes one or more or each of the first through third examples, and further includes wherein the contactor assembly includes electrical connections extending in an outer direction from an outer wall of the outer casing, the electrical connections spaced away and electrically isolated from one another. A fifth example of the motor assembly optionally includes one or more or each of the first through fourth examples, and further includes wherein the electrical connections include electrical motor connections adapted to connect to the motor, and further comprising a battery connection adapted to connect to an external power source, the battery connection extending outward from the outer casing. A sixth example of the motor assembly optionally includes one or more or each of the first through fifth examples, and further includes wherein the electrical motor connections are coupled to electrical contactor connections extending outward from the motor via wires extending between the electrical motor connections and the electrical contactor connections. A seventh example of the motor assembly optionally includes one or more or each of the first through sixth examples, and further includes a motor end cap enclosing each of the electrical motor connections, electrical contactor connections, and wires and wherein the motor end cap is coupled to the outer casing. An eighth example of the motor assembly optionally includes one or more or each of the first through seventh examples, and further includes a drum support coupled to an inner end of the motor and an inner end of the contactor assembly and wherein the motor and contactor assembly are contained within bounds defined by outer walls of the drum support. A ninth example of the motor assembly optionally includes one or more or each of the first through eighth examples, and further includes wherein a spindle of the motor is supported within an opening of the drum support by an annular bearing. A tenth example of the motor assembly optionally includes one or more or each of the first through ninth examples, and further includes a motor end cap coupled to an outer end wall of the contactor assembly, the outer end wall arranged opposite the inner end wall, and contained within the bounds defined by the outer walls of the drum support. An eleventh example of the motor assembly optionally includes one or more or each of the first through tenth examples, and further includes wherein an outer end of the motor is enclosed entirely by the motor end cap. In another embodiment, a motor assembly for a winch comprises: a drum support adapted to support a rotatable drum of the winch; a motor with a cylindrical housing coupled to the drum support; and a contactor assembly including an outer casing with a planar, inner end wall enclosed by the drum support and a plurality of angled inner surfaces coupled around and in face-sharing contact with a portion of the cylindrical housing of the motor, where for each inner surface of the plurality of angled inner surfaces, a corresponding line normal to the inner surface is perpendicular to a line normal to the inner end wall. In a first example of the motor assembly, the drum support includes outer walls defining an overall width and height of the motor assembly and an entirety of the motor and the contactor assembly are contained within bounds defined by the overall width and height. A second example of the motor assembly optionally includes the first example, and further includes wherein the contactor assembly includes two or more coils spaced apart from one another within the contactor assembly. A third example of the motor assembly optionally includes one or both of the first and second examples, and further includes wherein the contactor assembly includes a plurality of planar, outer top walls and a plurality of electrical connections extending outward and away from the plurality of outer top walls, and further comprising one or more wired connections connecting electrical connections of the motor to at least a portion of the plurality of electrical connections of the contactor assembly, the wired connections extending axially between the motor and the contactor assembly relative to a rotational axis of the motor. A fourth example of the motor assembly optionally includes one or more or each of the first through third examples, and further includes a motor end cap coupled to an outer end wall of the contactor assembly and enclosing the plurality of electrical connections of the contactor assembly, the wired connections, and the electrical connections of the motor.

In one embodiment, a winch comprises: a rotatable drum mounted between a first drum support and second drum support; a motor coupled to the first drum support; a contactor assembly coupled to the first drum support and coupled around an outer cylindrical surface of the motor; one or more electrical connections between the motor and the contactor assembly; and a motor end cap covering the one or more electrical connections and coupled to the contactor assembly. In a first example of the winch, the contactor assembly includes an outer casing and a first end of the outer casing is housed by the first drum support and an opposite, second end of the outer casing is housed by the motor end cap. A second example of the winch optionally includes the first example, and further includes wherein the first end and second end of the outer casing are planar end walls and wherein the outer casing further includes a plurality of angled inner surfaces positioned between the first end and second end and angled to have face-sharing contact with a portion of the outer cylindrical surface of the motor.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A motor assembly for a winch, comprising:
a first drum support;
a second drum support;
a motor, coupled to the first drum support, wherein the motor has a convex outer surface;
a contactor assembly coupled to the first drum support, wherein a concave inner surface of the contactor assembly is disposed adjacent to and in face-sharing contact with the convex outer surface of the motor;
a plurality of motor electrical connections;
a plurality of contactor electrical connections; and
a terminal cover covering the plurality of motor electrical connections, covering the plurality of contactor electrical connections, and coupled to the contactor assembly.

2. The motor assembly of claim 1, wherein the first drum support and the second drum support are adapted to support a rotatable drum of the winch.

3. The motor assembly of claim 1, wherein the contactor assembly includes an outer casing and wherein a first end of the outer casing is housed by the first drum support and an opposite, second end of the outer casing is housed by the motor end cap.

4. The motor assembly of claim 1, wherein a plurality of bus bars are disposed between each of the plurality of motor electrical connections and each of the plurality of contactor electrical connections.

5. The motor assembly of claim 4, wherein the plurality of bus bars includes two bus bars.

6. The motor assembly of claim 1, wherein the plurality of motor electrical connections extend from the motor along a first axis and wherein the plurality of contactor electrical connections extend from the motor along a second axis.

7. The motor assembly of claim 6, wherein the first axis is perpendicular to the second axis.

8. The motor assembly of claim 1, wherein the contactor assembly further includes a plurality of battery connections.

* * * * *